United States Patent
Tochi et al.

(10) Patent No.: US 8,243,456 B2
(45) Date of Patent: Aug. 14, 2012

(54) COMPONENT JOINING STRUCTURE, IC CARD, AND CONNECTOR

(75) Inventors: Akihiro Tochi, Kanagawa (JP); Masaki Tsujimoto, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 186 days.

(21) Appl. No.: 12/659,319

(22) Filed: Mar. 4, 2010

(65) Prior Publication Data

US 2010/0232118 A1    Sep. 16, 2010

(30) Foreign Application Priority Data

Mar. 10, 2009    (JP) ................................. 2009-056081

(51) Int. Cl.
*H05K 1/14* (2006.01)
(52) U.S. Cl. .......................... 361/737; 361/803; 156/73.1
(58) Field of Classification Search .................. 361/737, 361/801–803; 228/101, 110.1, 1.1, 103, 228/178, 179.1, 180.1, 180.21; 156/1, 60, 156/290, 349, 580, 580.1, 580.2, 73.1; 439/449, 439/460, 468, 625, 626, 660, 676; 340/391.1; 29/592, 592.1, 594
See application file for complete search history.

(56) References Cited

U.S. PATENT DOCUMENTS

| | | | | |
|---|---|---|---|---|
| 5,574,628 A | * | 11/1996 | Persia et al. | 361/737 |
| 5,886,402 A | * | 3/1999 | Onoda et al. | 257/679 |
| 5,923,026 A | * | 7/1999 | Onoda | 235/492 |
| 6,546,621 B2 | * | 4/2003 | Wang | 29/841 |
| 7,433,196 B1 | * | 10/2008 | Wang et al. | 361/752 |

FOREIGN PATENT DOCUMENTS

| | | |
|---|---|---|
| JP | 2000-293654 A | 10/2000 |
| JP | 3132355 B2 | 11/2000 |

* cited by examiner

*Primary Examiner* — Hung S Bui
(74) *Attorney, Agent, or Firm* — Rader, Fishman & Grauer PLLC

(57) ABSTRACT

An ultrasonic weld is provided in a cover component, is formed protruding from the cover component, and is provided so that it can join the cover component and the body component together by being fixed to the body component with ultrasonic welding. A locking mechanism is provided so that it can join the cover component and the body component together via engaging portions that engage with each other. The locking mechanism includes a first engaging portion provided in the cover component, and a second engaging portion that is provided in another component fixed to the body component, and that can engage with the first engaging portion. Thus, it is possible to decrease the number of components, and also reduce equipment costs and production control costs.

13 Claims, 16 Drawing Sheets

COMPONENT JOINING STRUCTURE, IC CARD, AND CONNECTOR

CROSS-REFERENCE TO RELATED APPLICATIONS

This application claims priority to Japanese Patent Application No. 2009-056081. The entire disclosure of Japanese Patent Application No. 2009-056081 is hereby incorporated herein by reference.

BACKGROUND OF THE INVENTION

1. Field of the Invention

The present invention relates to a component joining structure including a body component formed of a resin material, and a cover component that is formed of a metal material and is provided in the form of a cover covering at least part of the body component, wherein the body component and the cover component are joined together, and also relates to an IC card and a connector that include such a component joining structure.

2. Description of Related Art

Conventionally, as a component joining structure including a body component formed of a resin material and a cover component that is formed of a metal material and is provided in the form of a cover covering the body component, wherein the body component and the cover component are joined together, structures applied to IC cards are known (see Japanese Patent No. 3132355 and JP 2000-293654A). In the component joining structure disclosed in Japanese Patent No. 3132355, a bent portion is formed at an end face of a metal cover component (metal panel 4), and a hole is provided in this bent portion. This structure is configured so that the cover component is joined with ultrasonic welding to a resin body component (resin body case 1) at this bent portion.

In the component joining structure disclosed in JP 2000-293654A, a metal cover component (second panel 7), and a resin body component (frame 4) to which another metal cover component (first panel 6) is integrally fixed by simultaneous molding are provided. This structure is configured so that a locking member provided in the cover component and a locking member provided in the other cover component engage, thereby joining the cover component and the body component together.

For a product, such as an IC card, in which a component joining structure in which a body component and a cover component are joined together is provided, either a component joining structure as disclosed in Japanese Patent No. 3132355 that uses an ultrasonic welding system, or a component joining structure as disclosed in JP 2000-293654A that uses a mechanical locking system in which locking members are engaged with each other, is selected. Which of the structure using an ultrasonic welding system and the structure using a mechanical locking system is selected is determined according to various circumstances such as manufacturing reasons or required specifications on the part of a user or the like who, for example, performs final assembly of a product such as an IC card in which a component joining structure is provided, or uses such a product. For this reason, when a component joining structure for joining a body component and a cover component together is provided to a user or the like, a desired component joining structure using either an ultrasonic welding system or a mechanical locking system is provided in accordance with various circumstances as noted above.

As described above, in order to provide a component joining structure that satisfies needs, it is necessary to be able to provide both a component joining structure using an ultrasonic welding system and a component joining structure using a mechanical locking system. For this reason, it is necessary to fabricate two types of components of different joining systems. For this purpose, it is also necessary to prepare manufacturing facilities and molds with different specifications. Moreover, when a component joining structure is produced, various types of production control such as production process control, quality control and inventory control will need to be performed for each of the two types of components. This would lead to an undesirable increase in the number of components, equipment costs, and production control costs.

SUMMARY OF THE INVENTION

In view of the foregoing circumstances, it is an object of the present invention to provide a component joining structure whereby it is possible to decrease the number of components and also reduce equipment costs and production control costs. It is another object of the invention to provide an IC card and a connector that include such a component joining structure.

In order to achieve the above objects, a component joining structure according to a first aspect of the present invention is a component joining structure including a body component formed of a resin material, and a cover component that is formed of a metal material and is provided in the shape of a cover covering at least part of the body component, the body component and the cover component being joined together, the structure further including: at least one ultrasonic weld that is provided in the cover component, and is formed protruding from the cover component, and that can join the cover component and the body component together by being fixed to the body component with ultrasonic welding; and at least one locking mechanism that can join the cover component and the body component together via engaging portions that engage with each other, the locking mechanism including: at least one first engaging portion provided in the cover component; and at least one second engaging portion that is provided in the body component, or in another component fixed to the body component, and that can engage with the first engaging portion.

With this configuration, an ultrasonic weld that is formed protruding from a cover component is provided, and a locking mechanism including first and second engaging portions that can engage with each other is provided in the cover component and the body component or another component fixed to the body component. Accordingly, when a component joining structure using the ultrasonic welding system is needed, the cover component can be ultrasonically welded to the body component at its ultrasonic weld, thereby joining the cover component and the body component together. On the other hand, when a component joining structure using the mechanical locking system is needed, the first engaging portion and the second engaging portion can be engaged so as to provide locking (so as to prevent separation), thereby joining the cover component and the body component together. This makes it possible to provide a desired component joining structure, regardless of whichever of a joining system using the ultrasonic welding system and a joining system using the mechanical locking system is needed. Furthermore, since the component joining structure is provided with the ultrasonic weld and the locking mechanism, two types of joining systems can be realized using one type of component joining structure. Consequently, it is necessary to fabricate only one type of component, without the need to fabricate two types of components of different joining systems. It is also possible to reduce the need to prepare separate manufacturing facilities and molds with different specifications respectively adapted to the two types of components. Moreover, when the component joining structure is produced, it is necessary to perform various types of production control such as production process control, quality control and inventory control for only one type of component. Accordingly, with this configuration, it is possible to provide a component joining structure whereby it is possible to decrease the number of components, and also reduce equipment costs and production control costs.

Furthermore, with this configuration, the two joining systems, namely the ultrasonic welding system and the mechanical locking system, can be used in combination in one component joining structure, thereby joining the cover component and the body component together. Specifically, the cover component and the body component can be joined together by ultrasonically welding the ultrasonic weld of the cover component to the body component, and the cover component and the body component can be joined together by engaging the first engaging portion and the second engaging portion. Consequently, it is possible to improve the joining strength between the cover component and the body component.

A component joining structure according to a second aspect of the present invention is the component joining structure of the first aspect, wherein the first engaging portion is formed protruding from the cover component, and the ultrasonic weld and the first engaging portion are disposed so that they are aligned in the inwardly facing direction in the cover component.

With this configuration, the ultrasonic weld and the first engaging portion that protrude from the cover component are disposed so that they are aligned in the inwardly facing direction, and it is therefore possible to prevent the ultrasonic weld and the first engaging portion from being arranged wide apart with respect to the cover component, thereby arranging them in a small space efficiently. This makes it possible to realize both the ultrasonic welding system and the mechanical locking system in a smaller space, and also obtain a high joining strength.

A component joining structure according to a third aspect of the present invention is the component joining structure of the second aspect, wherein the ultrasonic weld and the first engaging portion are provided bent at an edge portion of the cover component, thereby protruding from the cover component, and one of the ultrasonic weld and the first engaging portion is formed bent on the inner side relative to the other at an edge portion of the cover component.

With this configuration, one of the ultrasonic weld and the first engaging portion can be formed bent on the inner side of an edge portion of the cover component, and the other can be formed bent on the outer side. Accordingly, the structure in which the ultrasonic weld and the first engaging portion that protrude from the cover component are disposed so that they are aligned in the inwardly facing direction can be easily formed by only bending.

A component joining structure according to a fourth aspect of the present invention is the component joining structure of the second aspect, wherein the ultrasonic weld is disposed on the inner side of the cover component relative to the first engaging portion.

As compared with the ultrasonic weld, which is welded to the body component by generating frictional heat by ultrasonic vibrations, the locking mechanism may be subject to more mechanical and placement constraints since it requires engagement operation of the first engaging portion with the second engaging portion. However, with this configuration, the ultrasonic weld and the body component can be ultrasonically welded together on the inner side of the cover component, and the first engaging portion and the second engaging portion can be engaged on the outer side. Accordingly, the locking mechanism can be disposed on the outer side where there is more room and less space limitations, which enables the locking mechanism to be formed more easily. This makes it possible to realize the structure in which the ultrasonic weld and the first engaging portion that protrude from the cover component are disposed so that they are aligned in the inwardly facing direction with a simpler configuration.

A component joining structure according to a fifth aspect of the present invention is the component joining structure of the fourth aspect, wherein the first engaging portion is provided as an annular portion protruding at an edge portion of the cover component, and the inside of the annular portion is formed as an engaging hole that engages with the second engaging portion, and the ultrasonic weld is disposed on the inner side of the cover component relative to the engaging hole, and is disposed overlapping the engaging hole in a direction perpendicular to the first engaging portion.

With this configuration, the first engaging portion is provided as an annular portion constituting an engaging hole that engages with the second engaging portion, so that the first engaging portion that securely engages with the second engaging portion can be easily formed in the form of a hole. Since the ultrasonic weld is provided so that it overlaps and is disposed on the inner side relative to the engaging hole, forming a notch on the inner side of the portion protruding from an edge portion of the cover component enables formation of the ultrasonic weld, along with formation of the engaging hole. Accordingly, the ultrasonic weld and the first engaging portion can be formed by efficiently using materials, thereby improving yield. Also, the engaging hole of the first engaging portion can be efficiently formed along with the ultrasonic weld, so that the structure in which the ultrasonic weld is disposed on the inner side relative to the first engaging portion can be formed more easily.

A component joining structure according to a sixth aspect of the present invention is the component joining structure of the first aspect, wherein a plurality of the ultrasonic welds and the first engaging portions are provided, and are alternately disposed aligned along an edge portion of the cover component.

With this configuration, the ultrasonic welding system and the mechanical locking system are alternately disposed aligned along an edge portion of the cover component, so that it is possible to prevent the occurrence of variations in joining strength due to an uneven distribution of the different joining systems. Accordingly, the joining strength can be made more uniform at positions along an edge portion of the cover component, thereby improving the joining strength of the joining structure as a whole. Furthermore, since the joining is performed at a plurality of locations at the positions along an edge portion of the cover component, the joining strength of the cover component to the body component can be efficiently secured with a fewer number of ultrasonic welds and locking mechanisms.

A component joining structure according to a seventh aspect of the present invention is the component joining structure of the first aspect, wherein the ultrasonic weld is provided as a pair of projections protruding parallel to each other from the cover component, and a portion where the interval between the pair of projections in a direction perpendicular to a protruding direction of the projections is smaller is formed at tip ends of the projections in the protruding direction.

With this configuration, the ultrasonic weld is provided as a pair of projections extending parallel to each other and being formed so that the interval between the pair of projections is smaller at their tip ends. Accordingly, in ultrasonic welding, the resin material of the body component that has been melted by frictional heat generated by ultrasonic vibrations flows deep within the pair of projections and then is solidified to be brought into the state in which it is caught with the tip ends, so that the ultrasonic weld and the body component are more firmly joined together with ultrasonic welding. Furthermore, the ultrasonic weld that can ensure higher joining strength can be easily formed by only providing the pair of projections and forming them such that the interval between the projections is smaller at their tip ends.

A component joining structure according to an eighth aspect of the present invention is the component joining structure of the seventh aspect, wherein a portion defined by the pair of projections and an edge portion of the cover component between the pair of projections is formed as an indentation that is indented in a curved manner.

With this configuration, the portion defined by the pair of projections and an edge portion between the pair of projections is provided as an indentation that is indented in a curved manner and is formed so as to become narrower towards its tip end. Accordingly, in ultrasonic welding, when the resin material of the body component that has been melted by frictional heat generated by ultrasonic vibrations flows deep within the indentation and is then solidified, the resin material is brought into a state in which it is spread to and caught with the tip end of the indentation. This brings about a state in which more of the resin material is caught with the ultrasonic weld, so that the ultrasonic weld and the body component are joined together firmly with ultrasonic welding.

A component joining structure according to a ninth aspect of the present invention is the component joining structure of the first aspect, wherein the first engaging portion engages with the second engaging portion at the same time as the ultrasonic weld is ultrasonically welded to the body component.

With this configuration, the first engaging portion and the second engaging portion engage at the same time as the ultrasonic welding is performed, so that the engaging operation using the locking mechanism can be performed simultaneously with the ultrasonic welding operation, and the joining with ultrasonic welding and the joining with the engagement of the locking mechanism thus can be completed by a single joining operation. Accordingly, the operation of joining the cover component and the body component together can be readily and quickly performed in the component joining structure in which the two joining systems, namely the ultrasonic welding system and the mechanical locking system, can be used in combination.

A component joining structure according to a tenth aspect of the present invention is the component joining structure of the first aspect, wherein the first engaging portion is formed protruding parallel to the ultrasonic weld from the cover component.

With this configuration, the ultrasonic weld and the first engaging portion are provided protruding parallel to each other, so that the direction in which the ultrasonic weld is brought close to the body component so as to be ultrasonically welded and the direction in which the first engaging portion is brought close to the body component so as to be engaged with the second engaging portion can be matched when the cover component is joined to the body component. Thus, the joining with ultrasonic welding and the joining with the engagement of the locking mechanism can be completed simultaneously or successively by a single joining operation. Accordingly, the operation of joining the cover component and the body component together can be readily and quickly performed in the component joining structure in which the two joining systems, namely the ultrasonic welding system and the mechanical locking system, can be used in combination.

A component joining structure according to an eleventh aspect of the present invention is the component joining structure of the first aspect, wherein the other component is provided as another cover component that is formed of a metal material and separate from the cover component, and that is fixed to the body component, and the second engaging portion is provided in the other cover component.

With this configuration, the second engaging portion is provided in another cover component that is formed of a metal material, so that the locking mechanism can be formed by metal materials. Accordingly, a ground can be formed by the cover component and the other cover component, and accumulation of static electricity can therefore be prevented by the cover component and the other cover component via the locking mechanism. Furthermore, since the second engaging portion is provided in the other cover component that is formed of a metal material, which is a material with high mechanical strength, the thickness of the element in which the second engaging portion is provided can be made smaller than when the second engaging portion is provided in the body component. Accordingly, it is possible to secure a large internal volume in the component joining structure, without increasing the external dimensions, thereby increasing the internal volume efficiently.

Furthermore, in order to achieve the above-described objects, an IC card according to the present invention is an IC card including the component joining structure of the first aspect, and a substrate assembly that is held inside the component joining structure, and that includes a substrate and a connector portion attached to the substrate, a connector-portion-penetrating ultrasonic weld that can penetrate through the connector portion to join the cover component and the body component together being provided as the ultrasonic weld, and a connector-portion-penetrating first engaging portion that can penetrate through the connector portion to engage with the second engaging portion being provided as the first engaging portion.

With this configuration, it is possible to realize an IC card that can achieve the same effects as the component joining structure of the first aspect. Accordingly, with this configuration, it is possible to provide an IC card including a component joining structure whereby it is possible to decrease the number of components, and also reduce equipment costs and production control costs. Furthermore, since the ultrasonic weld and the first engaging portion penetrate through the connector portion to join the cover component and the body component together, the substrate assembly can be stably held inside the component joining structure at its connector portion.

Furthermore, in order to achieve the above-described object, a connector according to the present invention is a connector including the component joining structure of the first aspect, and at least one terminal held by the body component, the connector being configured to be electrically connected to a mating connector component.

With this configuration, it is possible to realize a connector that can achieve the same effects as the component joining structure of the first aspect. That is, with this configuration, it is possible to provide a connector including a component joining structure whereby it is possible to decrease the number of components, and also reduce equipment costs and production control costs.

It should be appreciated that the above and other objects, and features and advantages of the present invention will become apparent from the following description taken in conjunction with the accompanying drawings.

DETAILED DESCRIPTION OF THE INVENTION

Hereinafter, embodiments of the present invention will be described with reference to the drawings. Although the following description takes as an example a case in which the present invention is applied to an IC card and a connector, application of the invention is not limited to such an example. Specifically, the present invention can be widely applied to various uses, as a component joining structure that includes a body component formed of a resin material and a cover component formed of a metal material, wherein the body component and the cover component are joined together, or as a structural body including such a component joining structure. When applied to an IC card and a connector, the present invention is applicable to various IC cards and connectors, other than those illustrated in the description of embodiments. For example, the present invention can be applied to a variety of IC cards, such as a PC card, a CF card, a CFast card, and an express card, that are mounted to a predetermined slot in various portable information devices such as a notebook personal computer, or mounted to a variety of connectors such as a shield connector. That is, the present invention can also be widely applied to various IC cards and connectors that include a component joining structure in which a resin body component and a metal cover component are joined together.

First Embodiment

Figure 1:
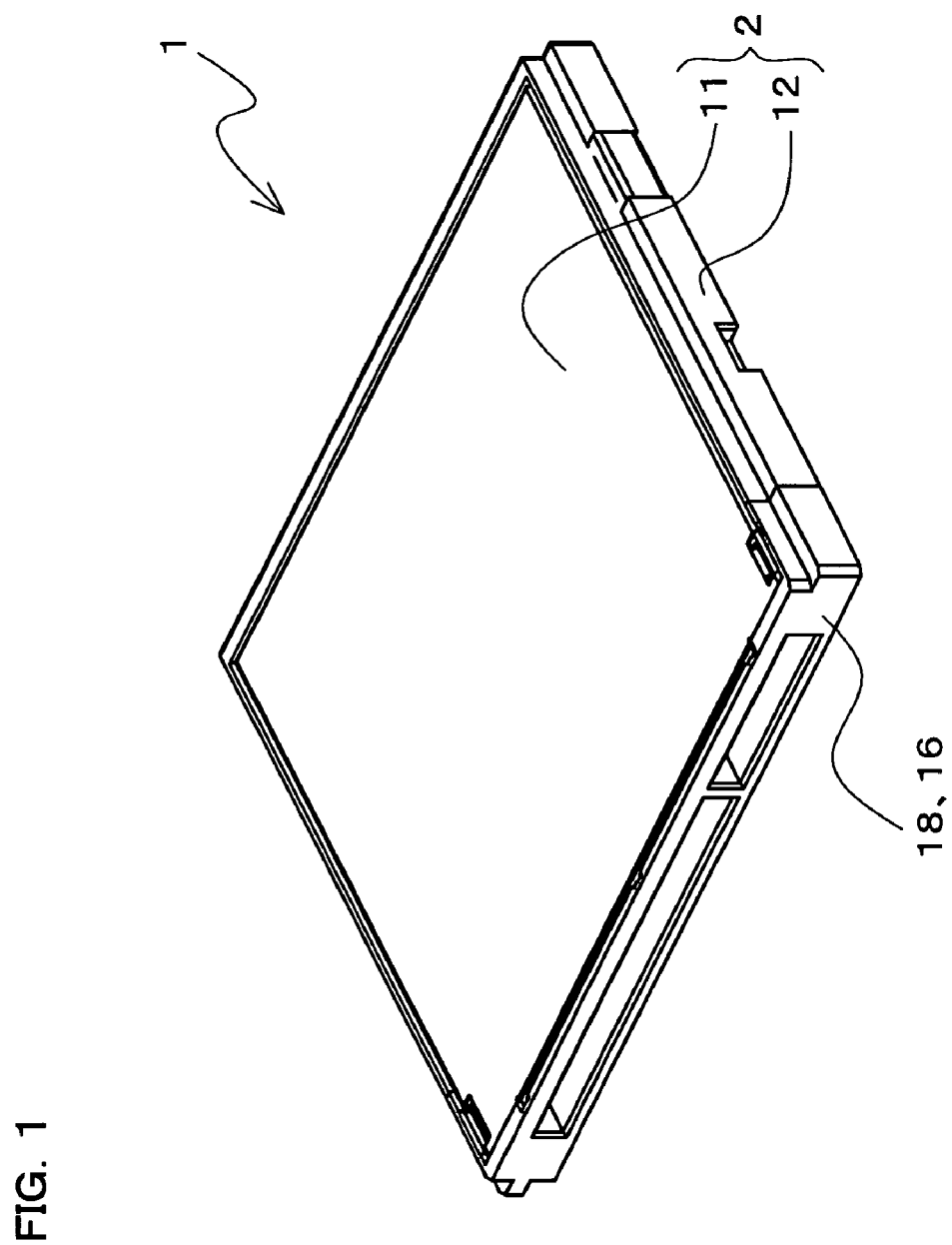
FIG. 1 is a perspective view showing an IC card according to a first embodiment of the present invention.
Figure 2:
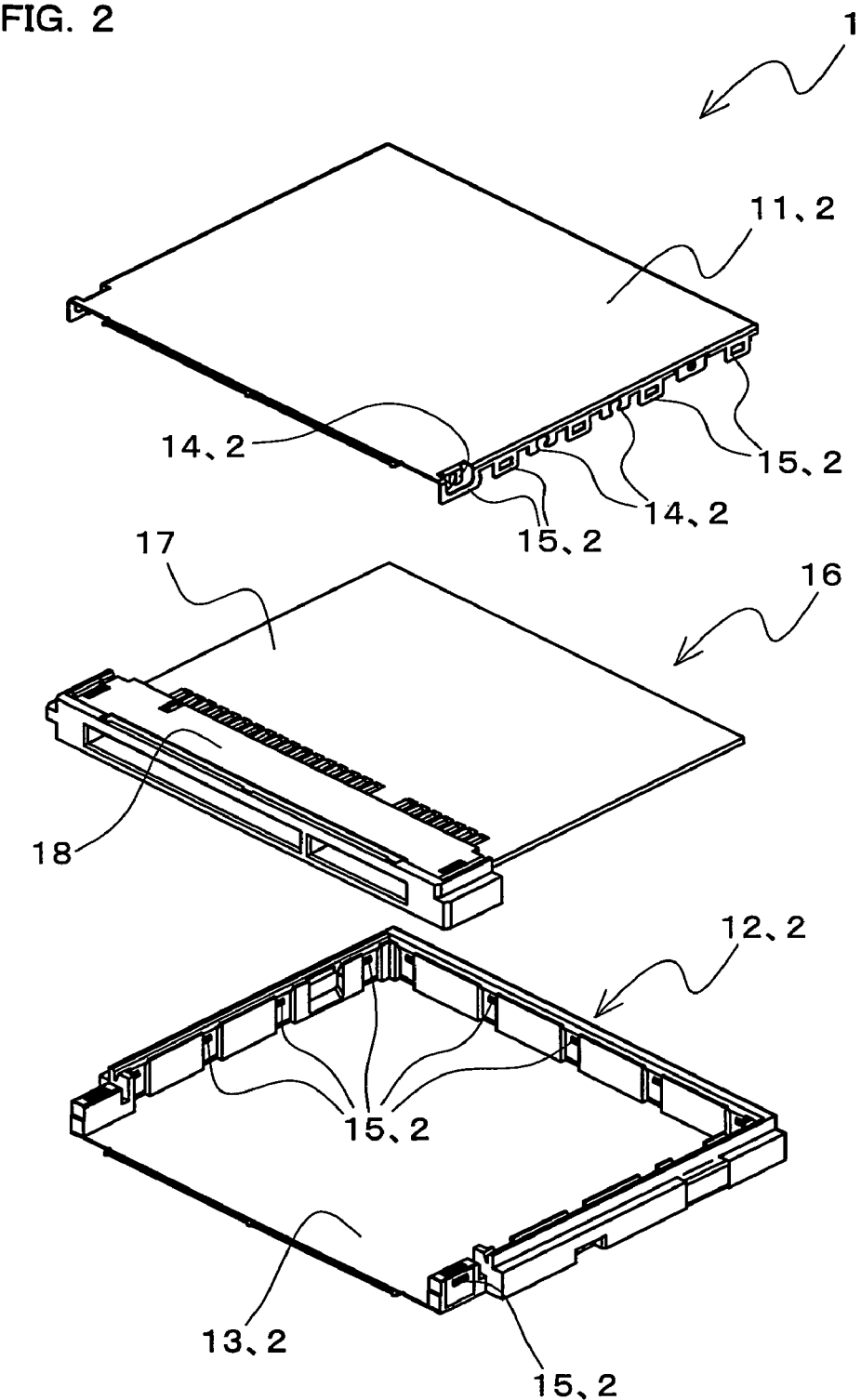
FIG. 2 is an exploded, perspective view of the IC card shown in FIG. 1.

FIG. 1 is a perspective view showing an IC card 1 according to a first embodiment of the present invention, and FIG. 2 is an exploded, perspective view of the IC card 1. The IC card 1 shown in FIGS. 1 and 2 is configured as a CF card, for example. The IC card 1 includes a component joining structure 2 according to the first embodiment of the present invention and a substrate assembly 16. The substrate assembly 16 is held inside the component joining structure 2, and includes a printed board 17 and a connector portion 18. Additionally, the connector portion 18 is attached to the printed board 17 along an edge portion of one side of the printed board 17, and is used to electrically connect a predetermined IC card slot of a portable information device (not shown) and the printed board 17.

The component joining structure 2 shown in FIGS. 1 and 2 includes a first metal cover 11, a body frame 12, a second metal cover 13, ultrasonic welds 14 and locking mechanisms 15, and is configured as a structure in which the body frame 12 and the first metal cover 11 are joined together. The body frame 12 is formed of a resin material, and constitutes a body component in this embodiment. The body frame 12 is provided in the form of a frame in which members corresponding to the positions of three sides of a rectangular shape are integrally formed.

The first metal cover 11 is formed of a metal material (e.g., a steel material), is provided in the form of a flat cover covering an inner portion of the body frame 12, and constitutes a cover component in this embodiment. The second metal cover 13 is formed of a metal material (e.g., a steel material) and is separate from the first metal cover 11, and is provided in the form of a flat cover covering an inner portion of the body frame 12 as with the first metal cover 11. The second metal cover 13 is disposed parallel to the first metal cover 11 in such a manner that it faces the first metal cover 11 with the body frame 12 interposed in between. Further, the second metal cover 13 is fixed to the body frame 12, and constitutes another cover component (another component) in this embodiment. Additionally, the second metal cover 13 is integrally fixed to the body frame 12, for example, by injection-molding the body frame 12 on the second metal cover 13.

Figure 3:
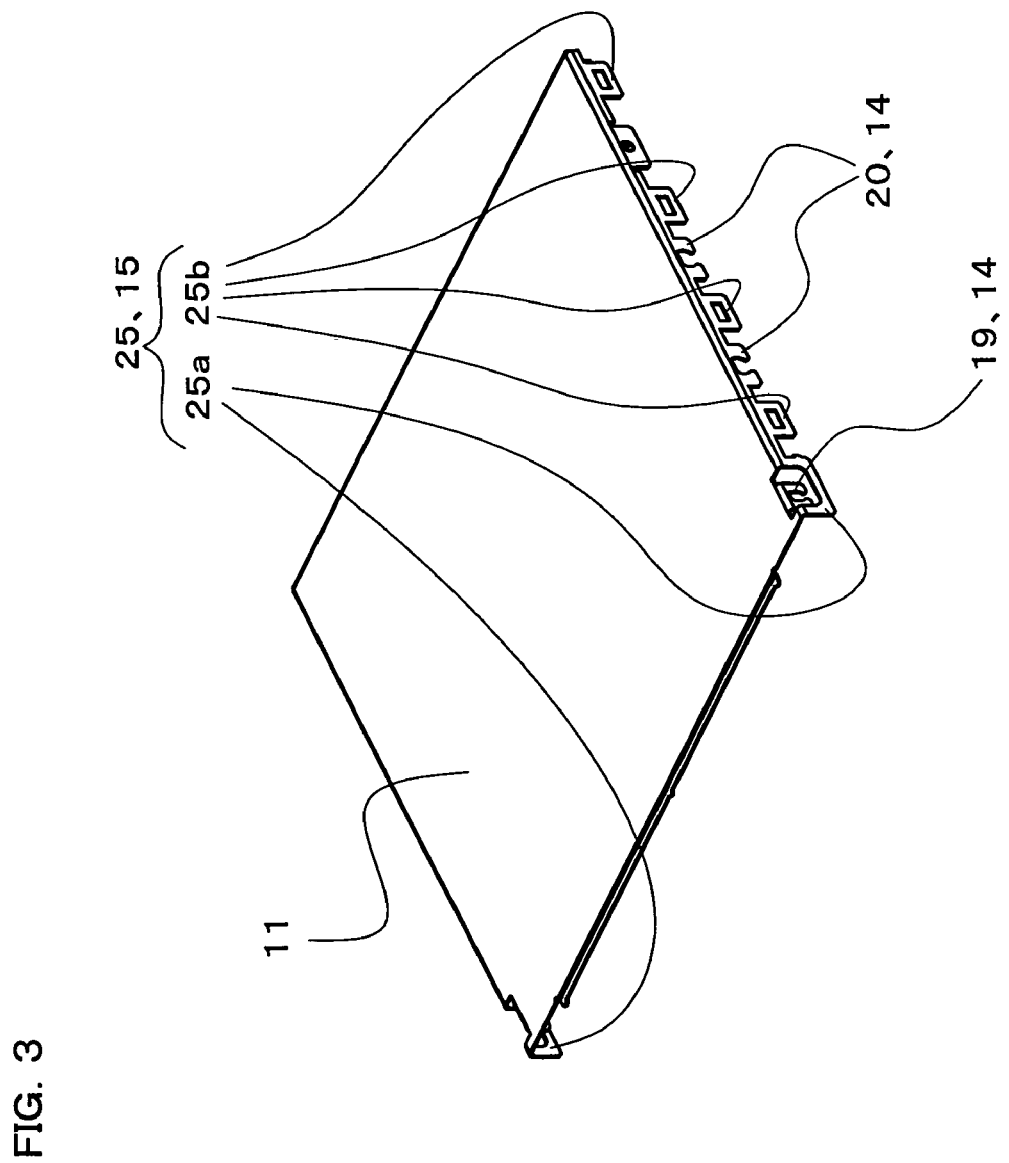
FIG. 3 is a perspective view showing a first metal cover, ultrasonic welds and part of locking mechanisms of the IC card shown in FIG. 2.

FIG. 3 is a perspective view showing the first metal cover 11, the ultrasonic welds 14 and part of the locking mechanisms 15. As shown in FIG. 3, corner ultrasonic welds 19 and periphery ultrasonic welds 20 are provided as the ultrasonic welds 14. Both types of the ultrasonic welds 14 (19, 20) are formed integrally with the first metal cover 11, and are formed protruding in the same direction from the first metal cover 11. As will be described below, the ultrasonic welds 14 are provided as elements that can join the first metal cover 11 and the body frame 12 together by being fixed to the body frame 12 with ultrasonic welding.

Figure 4A:
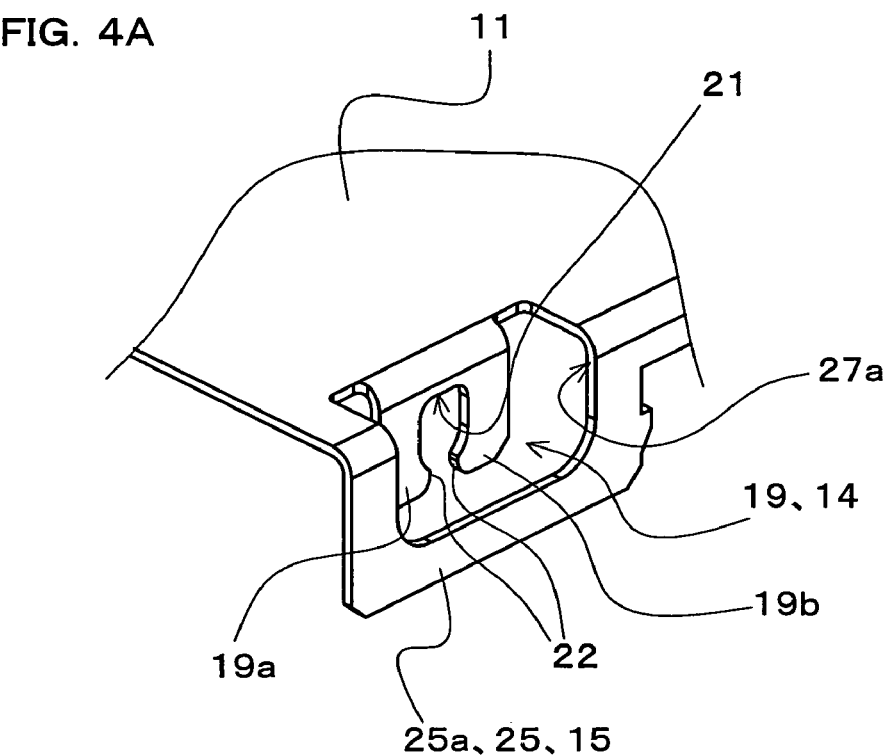
FIG. 4A is a perspective view showing, in partial enlargement, an ultrasonic weld shown in FIG. 3.
Figure 4B:
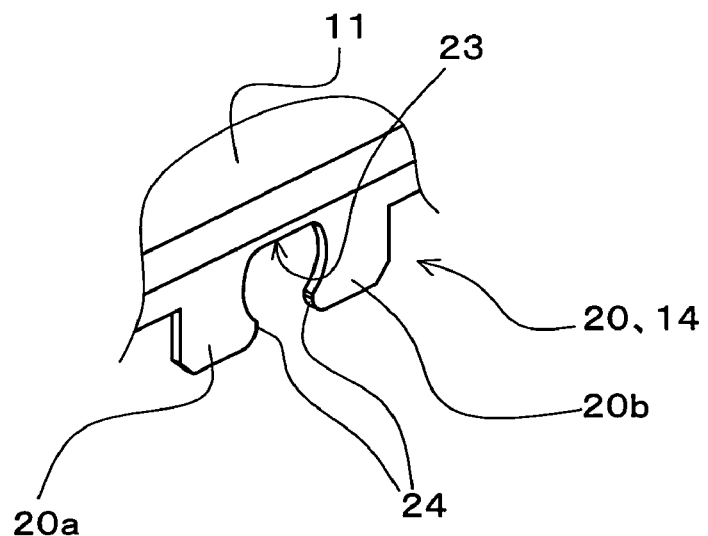
FIG. 4B is a perspective view showing, in partial enlargement, an ultrasonic weld shown in FIG. 3.

FIGS. 4A and 4B are perspective views showing, in partial enlargement, a corner ultrasonic weld 19 and a periphery ultrasonic weld 20. The corner ultrasonic weld 19 shown in FIGS. 3 and 4A is provided at positions corresponding to corner portions on both lateral sides of a part of an edge portion of the first metal cover 11 that faces the connector portion 18 in a state in which the component joining structure 2 is assembled (see FIG. 1). The corner ultrasonic weld 19 is provided bent at an edge portion of the first metal cover 11, thereby protruding from the first metal cover 11. Also, as is clearly shown in FIG. 4A, the corner ultrasonic weld 19 is provided as a pair of projections (19a, 19b) protruding parallel to each other from the first metal cover 11. The portion defined by the pair of projections (19a, 19b) and an edge portion of the first metal cover 11 between the pair of projections (19a, 19b) is formed as an indentation 21 that is indented in a curved manner. At the tip ends of the pair of projections (19a, 19b) in the protruding direction, a tip portion 22 is formed where the interval between the projections is smaller in a direction perpendicular to the protruding direction.

A plurality of the periphery ultrasonic welds 20 shown in FIGS. 3 and 4B are provided at positions corresponding to peripheral portions of the three sides of the first metal cover 11, except for the part of the edge portion that faces the connector portion 18 in a state in which the component joining structure 2 is assembled. In other words, the plurality of periphery ultrasonic welds 20 are disposed along an edge portion of the first metal cover 11. The periphery ultrasonic weld 20 is provided bent at an edge portion of the first metal cover 11, thereby protruding from the first metal cover 11. Also, as is clearly shown in FIG. 4B, the periphery ultrasonic weld 20 is provided as a pair of projections (20a, 20b) protruding parallel to each other from the first metal cover 11. The portion defined by the pair of projections (20a, 20b) and an edge portion of the first metal cover 11 between the pair of projections (20a, 20b) is formed as an indentation 23 that is indented in a curved manner. At the tip ends of the pair of projections (20a, 20b) in the protruding direction, a tip portion 24 is formed where the interval between the projections is smaller in a direction perpendicular to the protruding direction.

Figure 5:
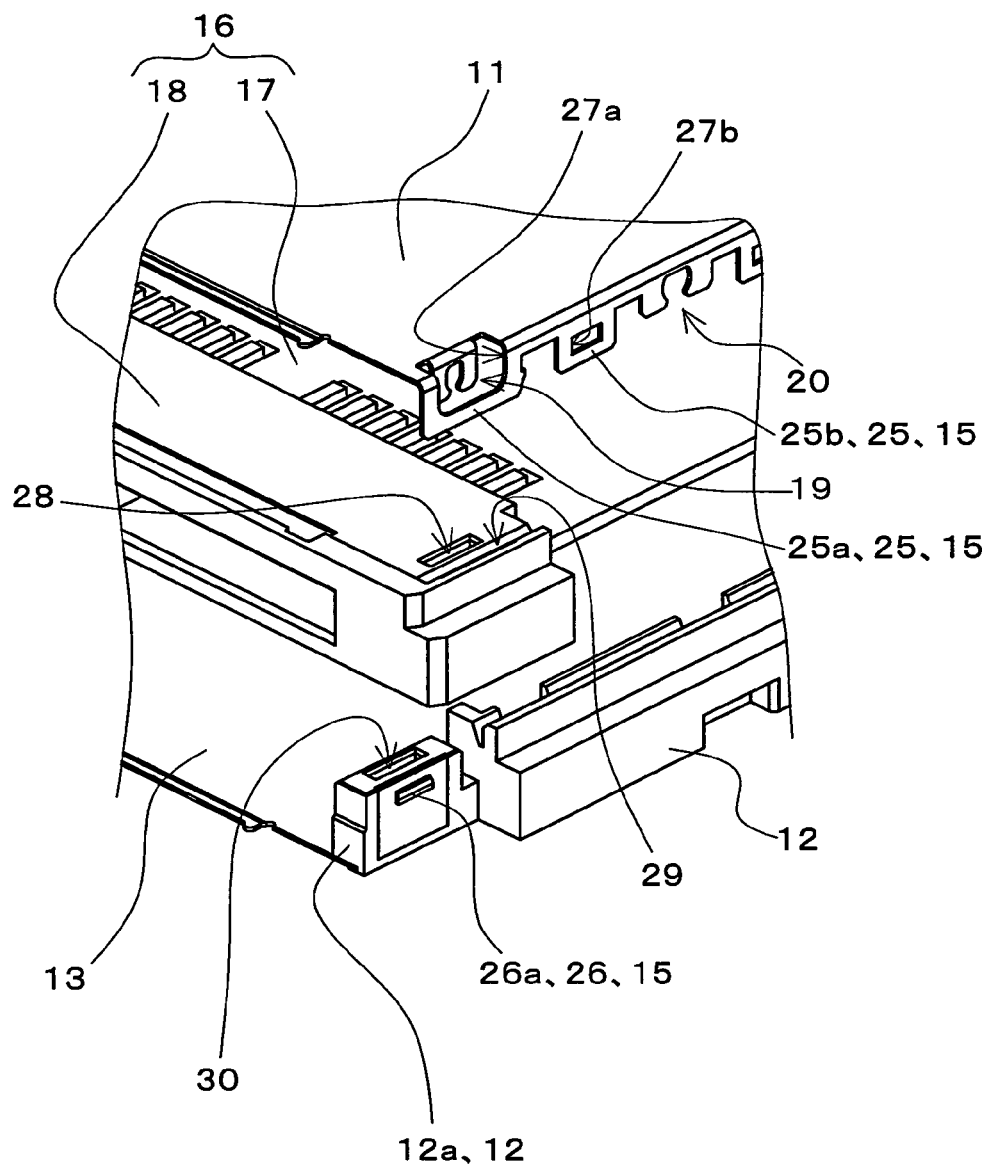
FIG. 5 is a partially enlarged view of the exploded, perspective view of the IC card shown in FIG. 2.
Figure 6:
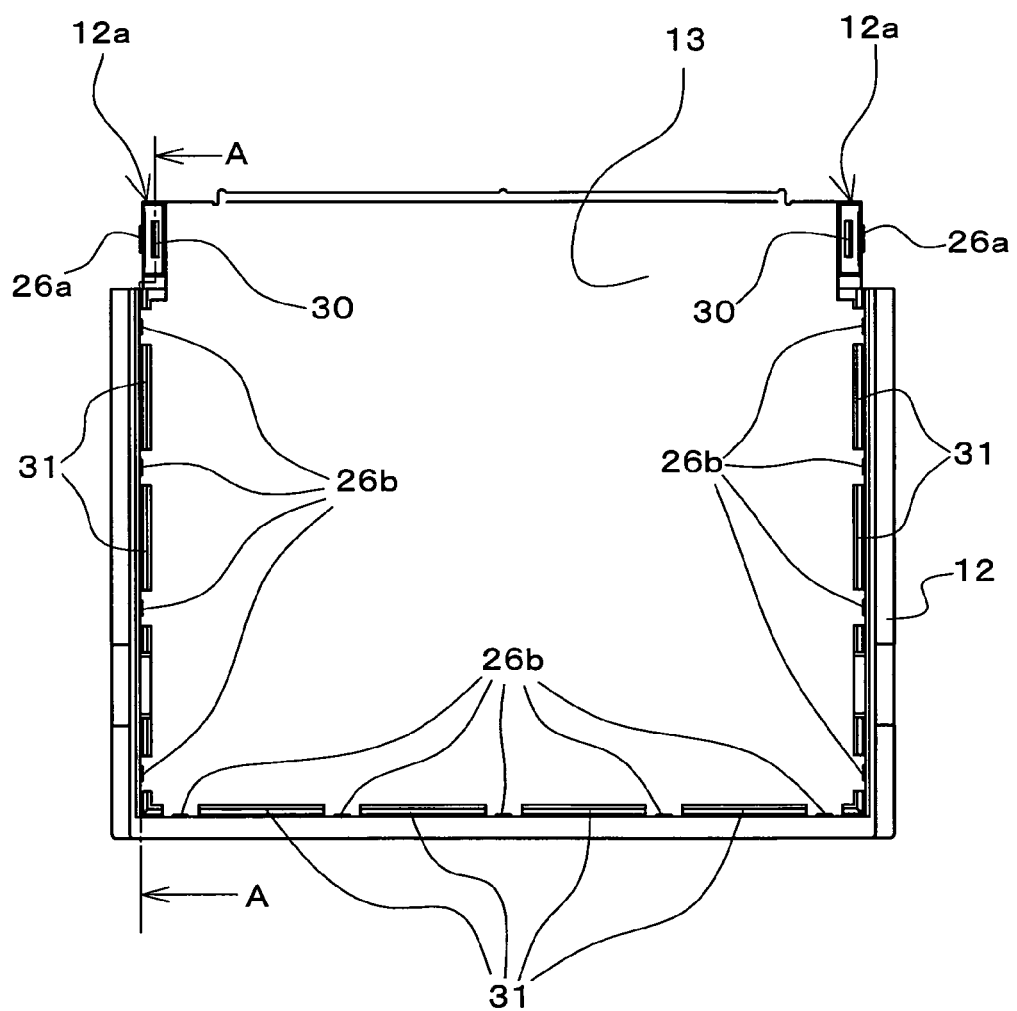
FIG. 6 is a plan view of a body frame and a second metal cover as shown in FIG. 2.
Figure 7:
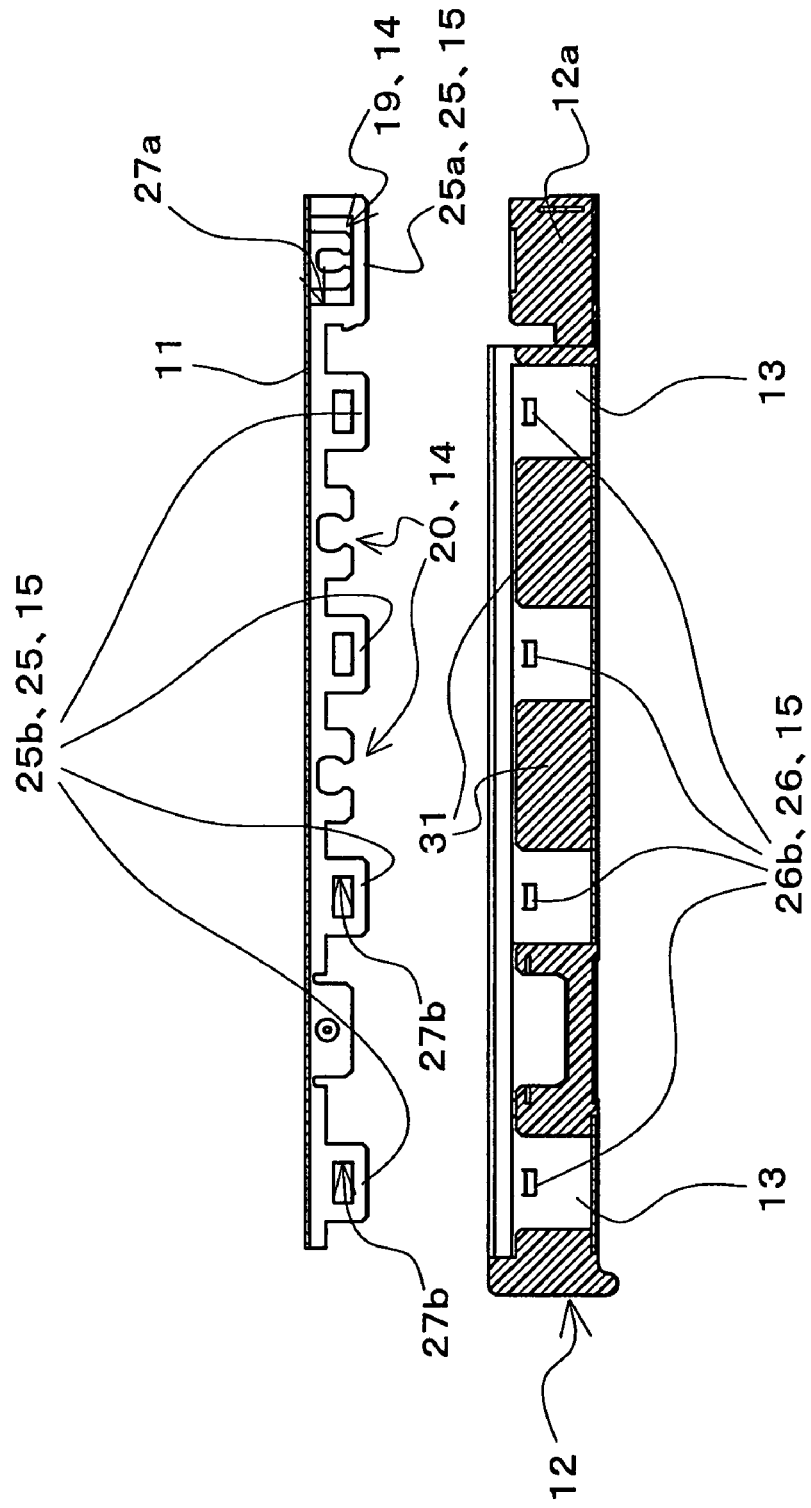
FIG. 7 is a cross-sectional view taken along arrows A-A in FIG. 6.

FIG. 5 is a partially enlarged view of the corner portion of the exploded, perspective view of the component joining structure 2. FIG. 6 is a plan view showing the body frame 12 and the second metal cover 13 that are integrated. FIG. 7 is a cross-sectional view taken along arrows A-A in FIG. 6. FIG. 7 also shows the first metal cover 11, the ultrasonic welds 14, and the like at the position corresponding to the cross-section taken along arrows A-A in FIG. 6. The locking mechanisms 15 shown in FIGS. 3 to 7 include a first engaging portion 25 and a second engaging portion 26, and are provided as mechanisms that can join the first metal cover 11 and the body frame 12 together via the first and second engaging portions (25, 26) that engage with each other.

As shown in FIGS. 3 to 5 and 7, first corner engaging portions 25a and first periphery engaging portions 25b are provided as the first engaging portions 25. Both types of the first engaging portions 25 (25a, 25b) are formed integrally with the first metal cover 11, and are formed protruding in the same direction from the first metal cover 11. Also, the first engaging portions 25 (25a, 25b) are formed protruding parallel to the ultrasonic welds 14 (19, 20) from the first metal cover 11. Further, the first engaging portions 25 (25a, 25b) are provided bent at an edge portion of the first metal cover 11, thereby protruding from the first metal cover 11.

The first corner engaging portion 25a shown in FIGS. 3 to 5 and 7 is provided at positions corresponding to corner portions on both lateral sides of a part of an edge portion of the first metal cover 11 that faces the connector portion 18 in a state in which the component joining structure 2 is assembled. The first corner engaging portion 25a and the corner ultrasonic weld 19 are disposed so that they are aligned in the inwardly facing direction in the first metal cover 11, and the corner ultrasonic weld 19 is disposed on the inner side of the first metal cover 11 relative to the first corner engaging portion 25a. Additionally, the corner ultrasonic weld 19 is formed bent at an edge portion of the first metal cover 11 on the inner side relative to the first corner engaging portion 25a. Further, the first corner engaging portion 25a is provided as an annular portion protruding at an edge portion of the first metal cover 11, and the inside of this annular portion is formed as an engaging hole 27a that engages with a second corner engaging portion 26a described below. The corner ultrasonic weld 19 is disposed on the inner side of the first metal cover 11 relative to the engaging hole 27a, and is also disposed overlapping the engaging hole 27a in a direction perpendicular to the first corner engaging portion 25a (see FIGS. 4A, 5 and 7).

A plurality of the first periphery engaging portions 25b shown in FIGS. 3 to 5 and 7 are provided at positions corresponding to peripheral portions of the three sides of the first metal cover 11, except for the part of the edge portion that faces the connector portion 18 in a state in which the component joining structure 2 is assembled. In other words, the plurality of first periphery engaging portions 25b are disposed along an edge portion of the first metal cover 11. The first periphery engaging portions 25b and the periphery ultrasonic welds 20 are alternately disposed aligned along an edge portion of the first metal cover 11. Also, the first periphery engaging portion 25b is provided as an annular portion protruding at an edge portion of the first metal cover 11, and the inside of this annular portion is formed as an engaging hole 27b that engages with a second periphery engaging portion 26b described below (see FIGS. 5 and 7).

As shown in FIGS. 5 to 7, second corner engaging portions 26a and second periphery engaging portions 26b are provided as the second engaging portions 26. Both types of the second engaging portions 26 (26a, 26b) are formed integrally with the second metal cover 13 that is fixed to the body frame 12. The second corner engaging portions 26a are provided at positions corresponding to corner portions on both lateral sides of a part of an edge portion of the second metal cover 13 that faces the connector portion 18 in a state in which the component joining structure 2 is assembled. The second corner engaging portion 26a is configured to be engageable with the first corner engaging portion 25a at the engaging hole 27a. Additionally, the second corner engaging portions 26a are formed as a projection protruding outwardly of the body frame 12. Meanwhile, a plurality of the second periphery engaging portions 26b are provided at positions corresponding to peripheral portions of the three sides of the second metal cover 13, except for the part of the edge portion that faces the connector portion 18 in a state in which the component joining structure 2 is assembled. In other words, the plurality of second periphery engaging portions 26b are disposed along an edge portion of the second metal cover 13. The second periphery engaging portion 26b is configured to be engageable with the first periphery engaging portion 25b at the engaging hole 27b. Additionally, the second periphery engaging portion 26b is formed as a projection protruding inwardly of the body frame 12.

The following is a description of an operation of the component joining structure 2 when the IC card 1 is assembled by joining the first metal cover 11 and the body frame 12 together. When the first metal cover 11 and the body frame 12 are joined together, the corner ultrasonic weld 19 and the periphery ultrasonic weld 20 are ultrasonically welded to the body frame 12 at the same time. At the same time as this ultrasonic welding is performed, the first corner engaging portion 25a engages with the second corner engaging portion 26a, and the first periphery engaging portion 25b engages with the second periphery engaging portion 26b.

Figure 8:
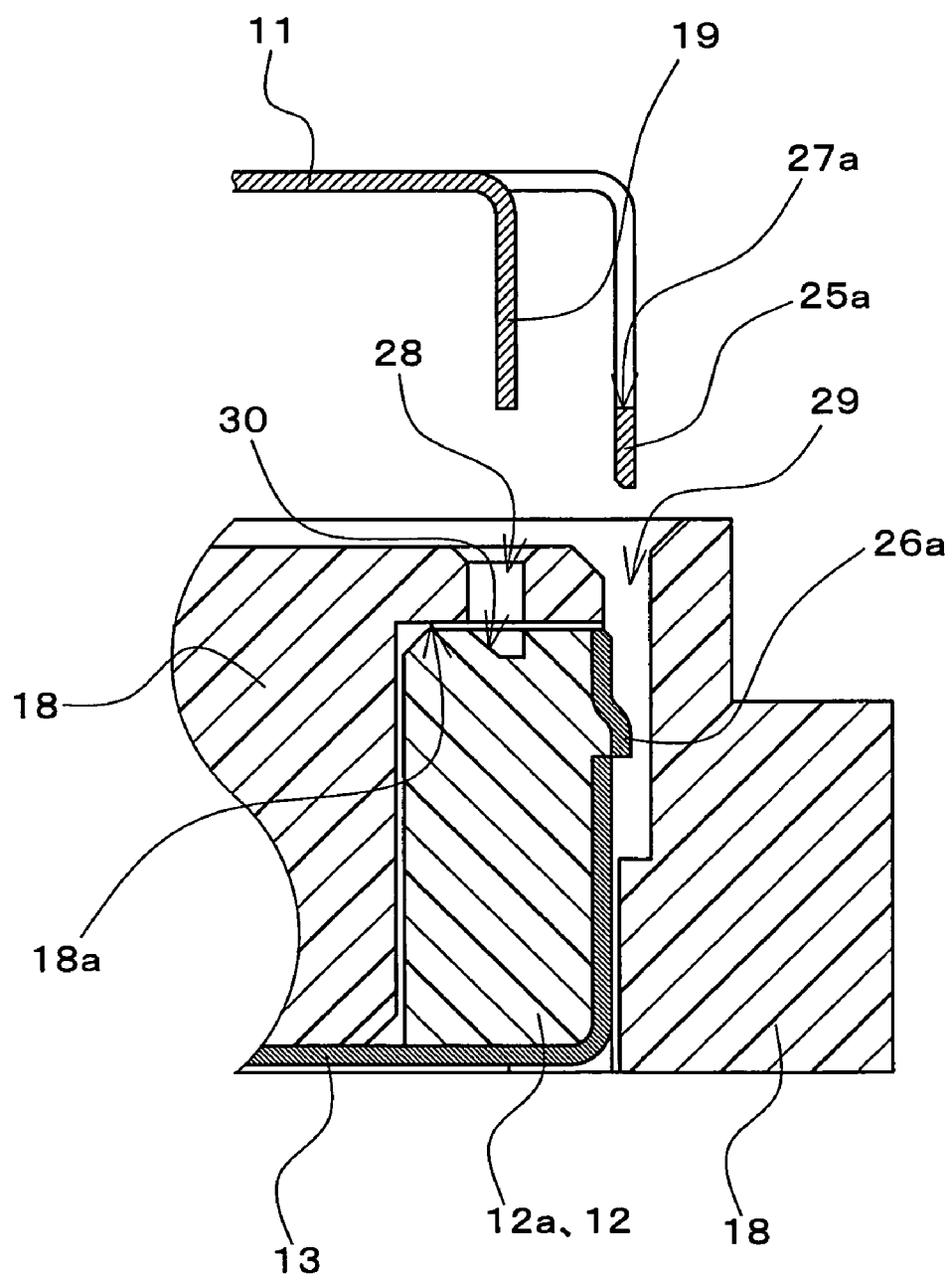
FIG. 8 is a partially enlarged, cross-sectional view for illustrating an operation of joining together the first metal cover and the body frame shown in FIG. 2.
Figure 9:
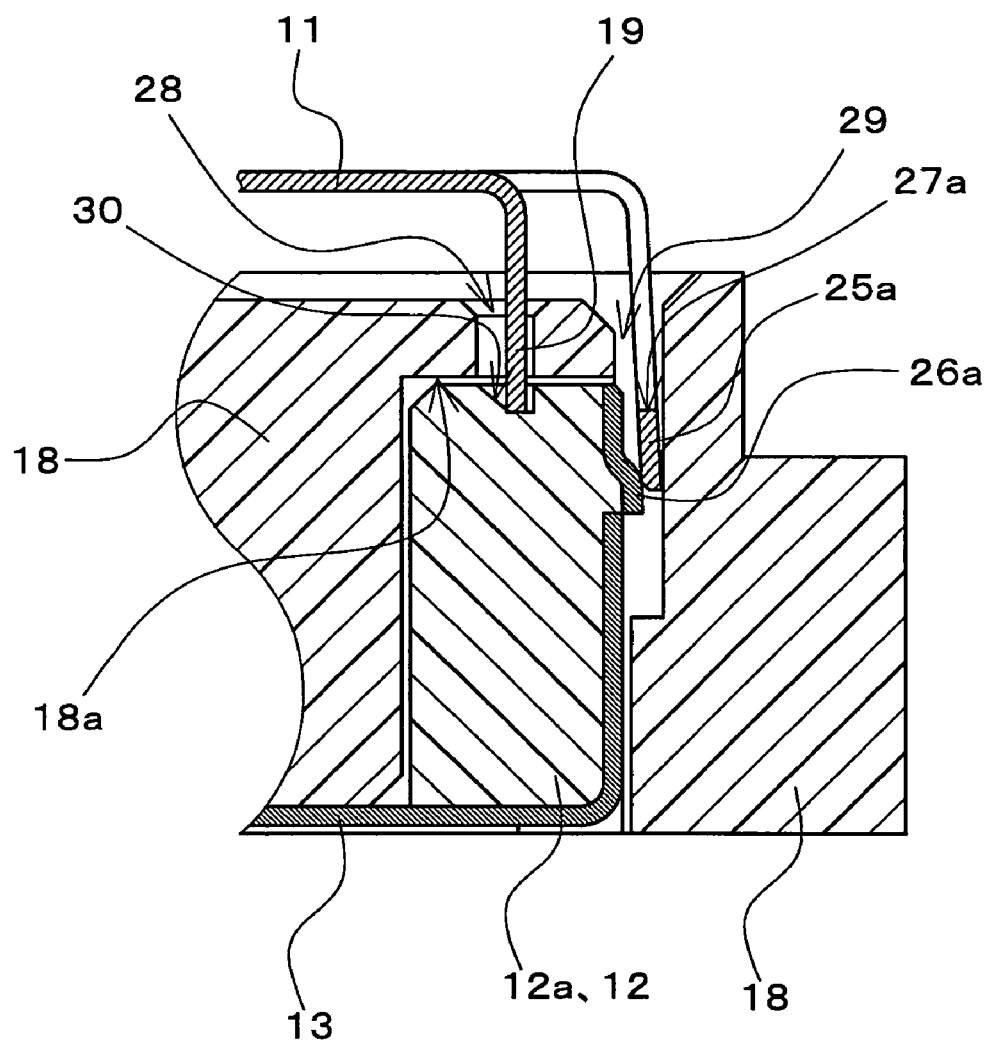
FIG. 9 is a partially enlarged, cross-sectional view for illustrating an operation of joining together the first metal cover and the body frame shown in FIG. 2.
Figure 10:
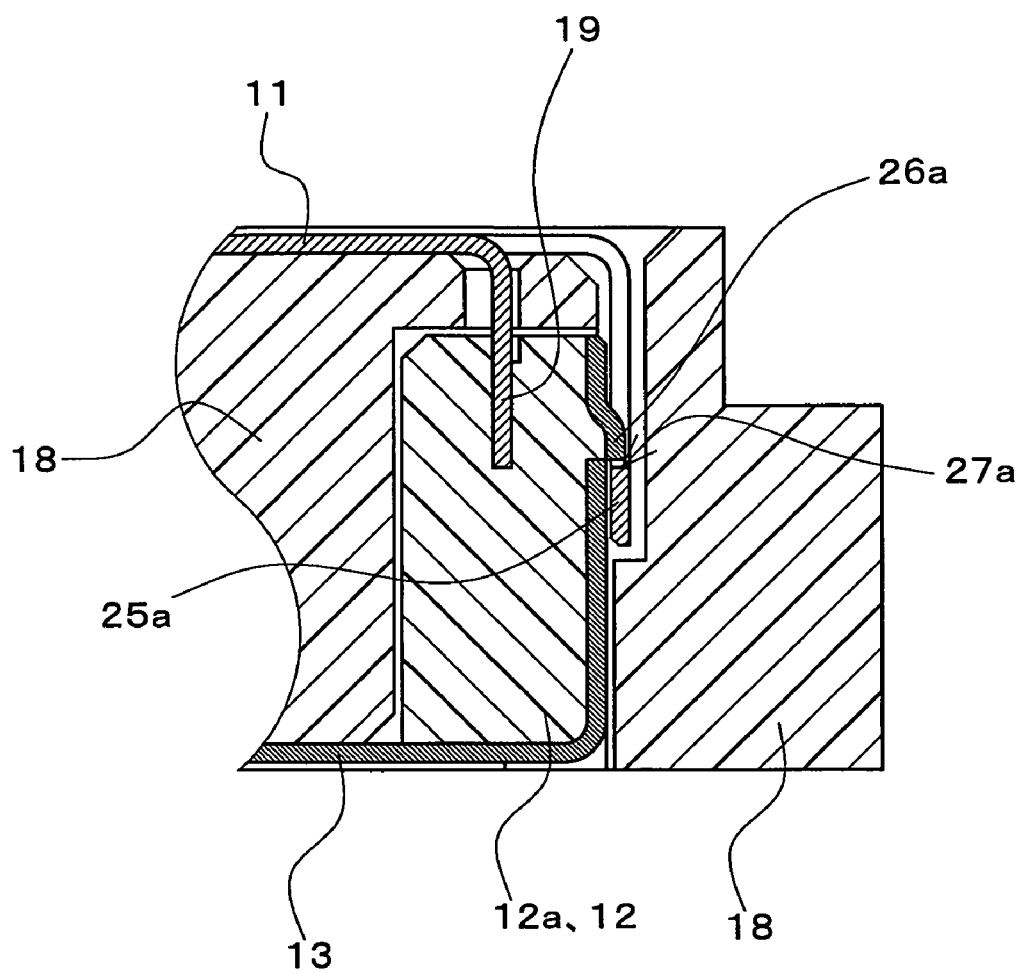
FIG. 10 is a partially enlarged, cross-sectional view for illustrating an operation of joining together the first metal cover and the body frame shown in FIG. 2.

FIGS. 8 to 10 are enlarged, cross-sectional views at a corner portion of the body frame 12 and the like for illustrating an operation of ultrasonically welding the corner ultrasonic weld 19 to the body frame 12, and an operation of engaging the first corner engaging portion 25a with the second corner engaging portion 26a. To assemble the IC card 1, first, the substrate assembly 16 is attached to the body frame 12 with which the second metal cover 13 is integrated. At this time, as shown in FIG. 8, a connector fitting portion 12a (see FIGS. 5 to 8) provided in the corner portion of the body frame 12 fits with a fitting recess 18a formed in the connector portion 18, and the substrate assembly 16 is thus attached to the body frame 12.

In a state in which the substrate assembly 16 is attached to the body frame 12, an operation of ultrasonically welding the corner ultrasonic weld 19 to the body frame 12 and an operation of engaging the first corner engaging portion 25a with the second corner engaging portion 26a are performed. A through-hole 28 and a slit 29 are formed in the connector portion 18 (see FIGS. 5 and 8). The corner ultrasonic weld 19 is inserted in the through-hole 28, and the first corner engaging portion 25a is inserted in the slit 29. At this time, as shown in FIG. 9, the corner ultrasonic weld 19 penetrates through the through-hole 28, and abuts against a recess 30 that is recessed in the connector fitting portion 12a. Also, the tip end of the first corner engaging portion 25a is in a state abutted against the second corner engaging portion 26a.

In the state shown in FIG. 9, ultrasonic vibrations are applied to the first metal cover 11 by an ultrasonic vibration generator (not shown). Consequently, the resin material of a portion of the body frame 12 that abuts against the corner ultrasonic weld 19 is melted by the frictional heat generated by the energy of the ultrasonic vibrations. Then, as shown in FIG. 10, the corner ultrasonic weld 19 is inserted to the inside of the body frame 12 while melting the resin material, and the application of ultrasonic vibrations is stopped when the corner ultrasonic weld 19 has been inserted to a predetermined insertion depth. Upon stopping the application of ultrasonic vibrations, the resin material that has been melted solidifies, so that the corner ultrasonic weld 19 is fixed to the body frame 12, thereby joining the first metal cover 11 and the body frame 12 together. It should be noted that in this embodiment, the corner ultrasonic weld 19 constitutes a connector-portion-penetrating ultrasonic weld that can penetrate through the connector portion 18 to join the first metal cover 11 and the body frame 12 together.

Further, in the above-described ultrasonic welding operation, the corner ultrasonic weld 19 is inserted to the inside of the body frame 12, and the first corner engaging portion 25a is also inserted toward the inside of the slit 29. Accordingly, as shown in FIG. 9, the tip end of the first corner engaging portion 25a that abuts against the second corner engaging portion 26a is elastically deformed so that it is flexed outward. Then, when the tip end of the first corner engaging portion 25a has moved so that it climbs over the second corner engaging portion 26a due to the first corner engaging portion 25a being further inserted toward the inside of the slit 29, the first corner engaging portion 25a engages with the second corner engaging portion 26a at its engaging hole 27a, as shown in FIG. 10. Consequently, the first metal cover 11 and the body frame 12 with which the second metal cover 13 is integrated are joined together via the engagement of the first corner engaging portion 25a with the second corner engaging portion 26a. It should be noted that in this embodiment, the first corner engaging portion 25a constitutes a connector-portion-penetrating first engaging portion that can penetrate through the connector portion 18 to engage with the second corner engaging portion 26a.

Further, along with the above-described ultrasonic welding operation and engaging operation at the corner portion, the operation of ultrasonically welding the periphery ultrasonic weld 20 to the body frame 12 and the operation of engaging the first periphery engaging portion 25b with the second periphery engaging portion 26b are performed at the same time. As shown in FIGS. 6 and 7, walls 31 disposed alternating with the inwardly protruding second periphery engaging portions 26b are formed at the body frame 12. Then, the first metal cover 11 is first placed on the body frame 12 so that the first periphery engaging portions 25b are brought into a state abutted against the walls 31 of the body frame 12. It should be noted that at this time, the corner ultrasonic welds 19 also abut against the recesses 30 of the body frame 12, as described above.

Figure 11:
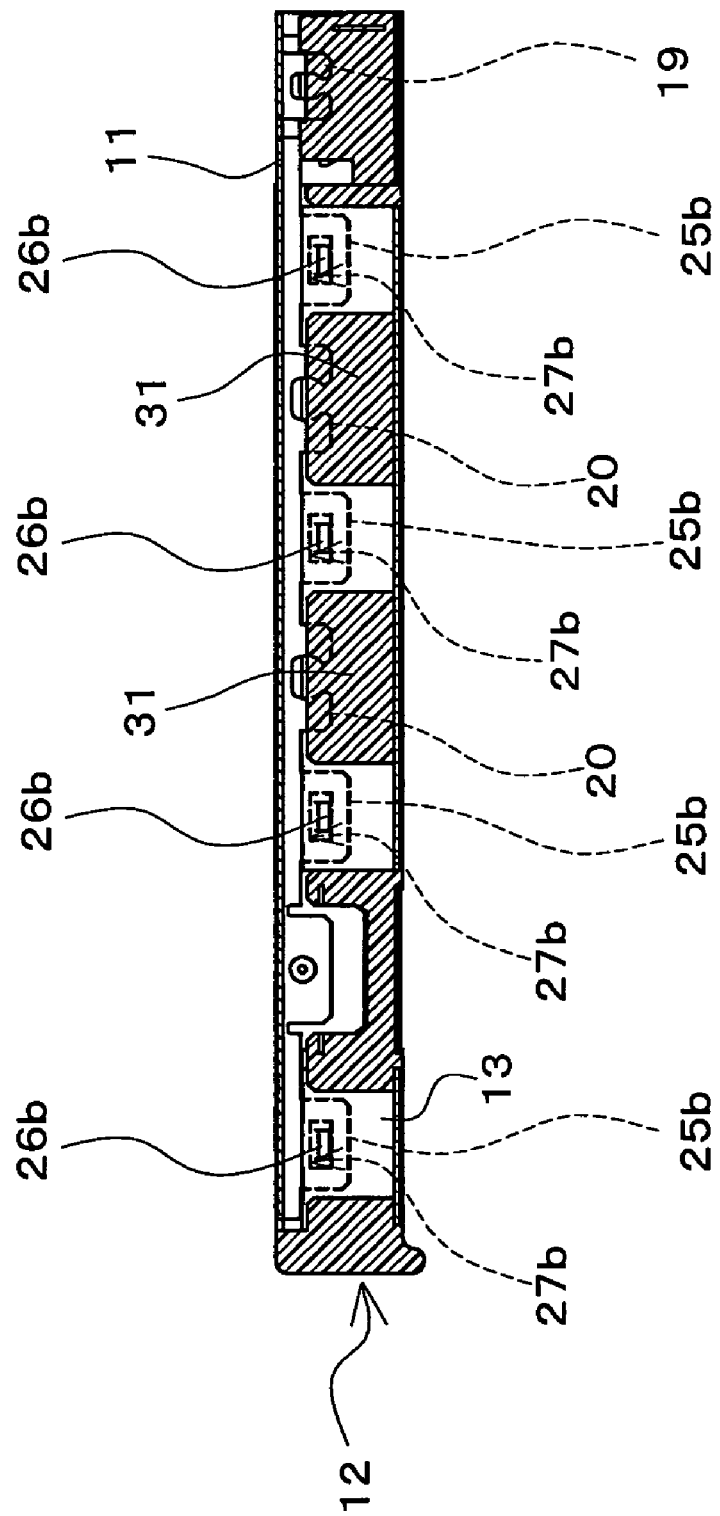
FIG. 11 is a cross-sectional view of the IC card shown in FIG. 1.

In the above-described state, ultrasonic vibrations are applied to the first metal cover 11 by an ultrasonic vibration generator (not shown). Consequently, the resin material of a portion of the wall 31 of the body frame 12 that abuts against the periphery ultrasonic weld 20 is melted by the frictional heat generated by the energy of the ultrasonic vibrations. Then, the periphery ultrasonic weld 20 is inserted to the inside of the wall 31 while melting the resin material, and the application of ultrasonic vibrations is stopped when the periphery ultrasonic weld 20 has been inserted to a predetermined insertion depth. FIG. 11 is a cross-sectional view corresponding to the cross section of FIG. 7 and showing a state in which the first metal cover 11 and the body frame 12 are joined together. As shown in FIG. 11, upon stopping the application of ultrasonic vibrations, the resin material that has been melted solidifies, so that the periphery ultrasonic welds 20 are fixed to the body frame 12, thereby joining the first metal cover 11 and the body frame 12 together.

Further, in the above-described ultrasonic welding operation, the periphery ultrasonic welds 20 are inserted to the inside of the walls 31, and the first periphery engaging portions 25b are also moved in a parallel manner. Accordingly, the tip ends of the first periphery engaging portions 25b abuts against the second periphery engaging portions 26b, and thereafter are elastically deformed in such a manner that it is flexed inward temporarily. Then, when the first periphery engaging portions 25b have further moved so as to climb over the second periphery engaging portions 26b on the inside, the first periphery engaging portions 25b engage with the second periphery engaging portions 26b at the engaging holes 27b, as shown in FIG. 11. Consequently, the first metal cover 11 and the body frame 12 with which the second metal cover 13 is integrated are joined together via the engagement of the first periphery engaging portions 25b with the second periphery engaging portions 26b.

As described above, in the ultrasonic welding, the corner ultrasonic weld 19 and the periphery ultrasonic weld 20 are ultrasonically welded to the body frame 12 at the same time. Furthermore, at the same time as this ultrasonic welding is performed, the first corner engaging portion 25a engages with the second corner engaging portion 26a, and the first periphery engaging portion 25b engages with the second periphery engaging portion 26b. Consequently, the first metal cover 11 and the body frame 12 are joined together, thus completing assembly of the IC card 1.

With the component joining structure 2 described thus far, the ultrasonic weld 14 that is formed protruding from the first metal cover 11 is provided, and the locking mechanism 15 including the first and second engaging portions (25, 26) that can engage with each other is provided in the first metal cover 11 and the second metal cover 13 fixed to the body frame 12. Accordingly, when a component joining structure using the ultrasonic welding system is needed, the first metal cover 11 can be ultrasonically welded to the body frame 12 at its ultrasonic weld 14, thereby joining the first metal cover 11 and the body frame 12 together. On the other hand, when a component joining structure using the mechanical locking system is needed, the first engaging portion 25 and the second engaging portion 26 can be engaged so as to provide locking, thereby joining the first metal cover 11 and the body frame 12 together. This makes it possible to provide a desired component joining structure, regardless of whichever of a joining system using the ultrasonic welding system and a joining system using the mechanical locking system is needed. Furthermore, since the component joining structure 2 is provided with the ultrasonic weld 14 and the locking mechanism 15, two types of joining systems can be realized using one type of component joining structure 2. Consequently, it is necessary to fabricate only one type of component, without the need to fabricate two types of components of different joining systems. It is also possible to reduce the need to prepare separate manufacturing facilities and molds with different specifications respectively adapted to the two types of components. Moreover, when the component joining structure 2 is produced, it is necessary to perform various types of production control such as production process control, quality control and inventory control for only one type of component. Accordingly, with this embodiment, it is possible to provide a component joining structure 2 whereby it is possible to decrease the number of components, and also reduce equipment costs and production control costs.

Furthermore, with the component joining structure 2, the two joining systems, namely the ultrasonic welding system and the mechanical locking system, can be used in combination in one component joining structure 2, thereby joining the first metal cover 11 and the body frame 12 together. Specifically, the first metal cover 11 and the body frame 12 can be joined together by ultrasonically welding the ultrasonic weld 14 of the first metal cover 11 to the body frame 12, and the first metal cover 11 and the body frame 12 can be joined together by engaging the first engaging portion 25 and the second engaging portion 26. Consequently, it is possible to improve the joining strength between the first metal cover 11 and the body frame 12.

Furthermore, with the component joining structure 2, the corner ultrasonic weld 19 and the first corner engaging portion 25a that protrude from the first metal cover 11 are disposed so that they are aligned in the inwardly facing direction, and it is therefore possible to prevent the corner ultrasonic weld 19 and the first corner engaging portion 25a from being arranged wide apart with respect to the first metal cover 11, thereby arranging them in a small space efficiently. This makes it possible to realize both the ultrasonic welding system and the mechanical locking system in a smaller space, and also obtain a high joining strength.

Furthermore, with the component joining structure 2, the corner ultrasonic weld 19 can be formed bent on the inner side of an edge portion of the first metal cover 11, and the first corner engaging portion 25a can be formed bent at the outer side. Accordingly, the structure in which the ultrasonic weld 19 and the first engaging portion 25a that protrude from the first metal cover 11 are so that they are aligned in the inwardly facing direction can be easily formed by only bending.

Furthermore, with the component joining structure 2, the corner ultrasonic weld 19 and the body frame 12 can be ultrasonically welded together on the inner side of the first metal cover 11, and the first corner engaging portion 25a and the second corner engaging portion 26a can be engaged on the outer side. Accordingly, the locking mechanism 15 can be disposed on the outer side where there is more room and less space limitations, which enables the locking mechanism 15 to be formed more easily. This makes it possible to realize the structure in which the corner ultrasonic weld 19 and the first corner engaging portion 25a that protrude from the first metal cover 11 are disposed so that they are aligned in the inwardly facing direction with a simpler configuration.

Furthermore, with the component joining structure 2, the first engaging portion 25 is provided as an annular portion constituting the engaging hole (27a, 27b) that engages with the second engaging portion 26, so that the first engaging portion 25 that securely engages with the second engaging portion 26 can be easily formed in the form of a hole. Since the corner ultrasonic weld 19 is provided so that it overlaps and is disposed on the inner side relative to the engaging hole 27a, forming a notch on the inner side of the portion protruding from an edge portion of the first metal cover 11 enables formation of the corner ultrasonic weld 19, along with formation of the engaging hole 27a. Accordingly, the corner ultrasonic weld 19 and the first corner engaging portion 25a can be formed by efficiently using materials, thereby improving yield. Also, the engaging hole 27a of the first corner engaging portion 25a can be efficiently formed along with the corner ultrasonic weld 19, so that the structure in which the corner ultrasonic weld 19 is disposed on the inner side relative to the first corner engaging portion 25a can be formed more easily.

Furthermore, with the component joining structure 2, the periphery ultrasonic weld 20, and the first periphery engaging portion 25b and the second periphery engaging portion 26b are provided in an alternating manner along an edge portion of the first metal cover 11. Accordingly, the ultrasonic welding system and the mechanical locking system are alternately disposed aligned along an edge portion of the first metal cover 11, so that it is possible to prevent the occurrence of variations in joining strength due to an uneven distribution of the different joining systems. Accordingly, the joining strength can be made more uniform at positions along an edge portion of the first metal cover 11, thereby improving the joining strength of the joining structure as a whole. Furthermore, since the joining is performed at a plurality of locations at the positions along an edge portion of the first metal cover 11, the joining strength of the first metal cover 11 to the body frame 12 can be efficiently secured with a fewer number of ultrasonic welds 14 and locking mechanisms 15.

Further, with the component joining structure 2, the ultrasonic weld (19, 20) is provided as a pair of projections (19a and 19b, 20a and 20b) extending parallel to each other and being formed such that the interval between the pair of projections is smaller at their tip ends. Accordingly, in ultrasonic welding, the resin material of the body frame 12 that has been melted by frictional heat generated by ultrasonic vibrations flows deep within the pair of projections (19a and 19b, 20a and 20b) and then is solidified to be brought into the state in which it is caught with the tip ends, so that the ultrasonic weld (19, 20) and the body frame 12 are more firmly joined together with ultrasonic welding. Furthermore, the ultrasonic weld (19, 20) that can ensure higher joining strength can be easily formed by only providing the pair of projections (19a and 19b, 20a and 20b) and forming them such that the interval between the projections is smaller at their tip ends.

Furthermore, with the component joining structure 2, the portion defined by the pair of projections (19a and 19b, 20a and 20b) and an edge portion between the pair of projections is provided as an indentation (21, 23) that is indented in a curved manner and is formed so as to become narrower towards its tip end. Accordingly, in ultrasonic welding, when the resin material of the body frame 12 that has been melted by frictional heat generated by ultrasonic vibrations flows deep within the indentation (21, 23) and is then solidified, the resin material is brought into a state in which it is spread to and caught with the tip end of the indentation (21, 23). This brings about a state in which more of the resin material is caught with the ultrasonic weld (19, 20), so that the ultrasonic weld (19, 20) and the body frame 12 are joined together firmly with ultrasonic welding.

Furthermore, with the component joining structure 2, the first engaging portion 25 and the second engaging portion 26 engage at the same time as the ultrasonic welding is performed, so that the engaging operation using the locking mechanism 15 can be performed simultaneously with the ultrasonic welding operation, and the joining with ultrasonic welding and the joining with the engagement of the locking mechanism 15 thus can be completed by a single joining operation. Accordingly, the operation of joining the first metal cover 11 and the body frame 12 together can be readily and quickly performed in the component joining structure 2 in which the two joining systems, namely the ultrasonic welding system and the mechanical locking system, can be used in combination.

Furthermore, with the component joining structure 2, the ultrasonic weld 14 and the first engaging portion 25 are provided protruding parallel to each other, so that the direction in which the ultrasonic weld 14 is brought close to the body frame 12 so as to be ultrasonically welded and the direction in which the first engaging portion 25 is brought close to the body frame 12 so as to be engaged with the second engaging portion 26 can be matched when the first metal cover 11 is joined to the body frame 12. Thus, the joining with ultrasonic welding and the joining with the engagement of the locking mechanism 15 can be completed simultaneously or successively by a single joining operation. Accordingly, the operation of joining the first metal cover 11 and the body frame 12 together can be readily and quickly performed in the component joining structure 2 in which the two joining systems, namely the ultrasonic welding system and the mechanical locking system, can be used in combination.

Furthermore, with the component joining structure 2, the second engaging portion 26 is provided in the second metal cover 13, which is another cover component formed of a metal material, so that the locking mechanism 15 can be formed by metal materials. Accordingly, a ground can be formed by the first metal cover 11 and the second metal cover 13, and accumulation of static electricity can therefore be prevented by the first metal cover 11 and the second metal cover 12 via the locking mechanism 15. Furthermore, since the second engaging portion 26 is provided in the second metal cover 13 that is formed of a metal material, which is a material with high mechanical strength, the thickness of the element in which the second engaging portion 26 is provided can be made smaller than when the second engaging portion 26 is provided in the body frame 12. Accordingly, it is possible to secure a large internal volume in the component joining structure 2, without increasing the external dimensions, thereby increasing the internal volume efficiently.

Furthermore, with the IC card 1, it is possible to realize an IC card that can achieve the same effects as the component joining structure 2. Accordingly, with this embodiment, it is possible to provide an IC card 1 including a component joining structure 2 whereby it is possible to decrease the number of components, and also reduce equipment costs and production control costs. Furthermore, since the corner ultrasonic weld 19 and the first corner engaging portion 25a penetrate through the connector portion 18 to join the first metal cover 11 and the body frame 12 together, the substrate assembly 16 can be stably held inside the component joining structure 2 at its connector portion 18.

Second Embodiment

Figure 12:
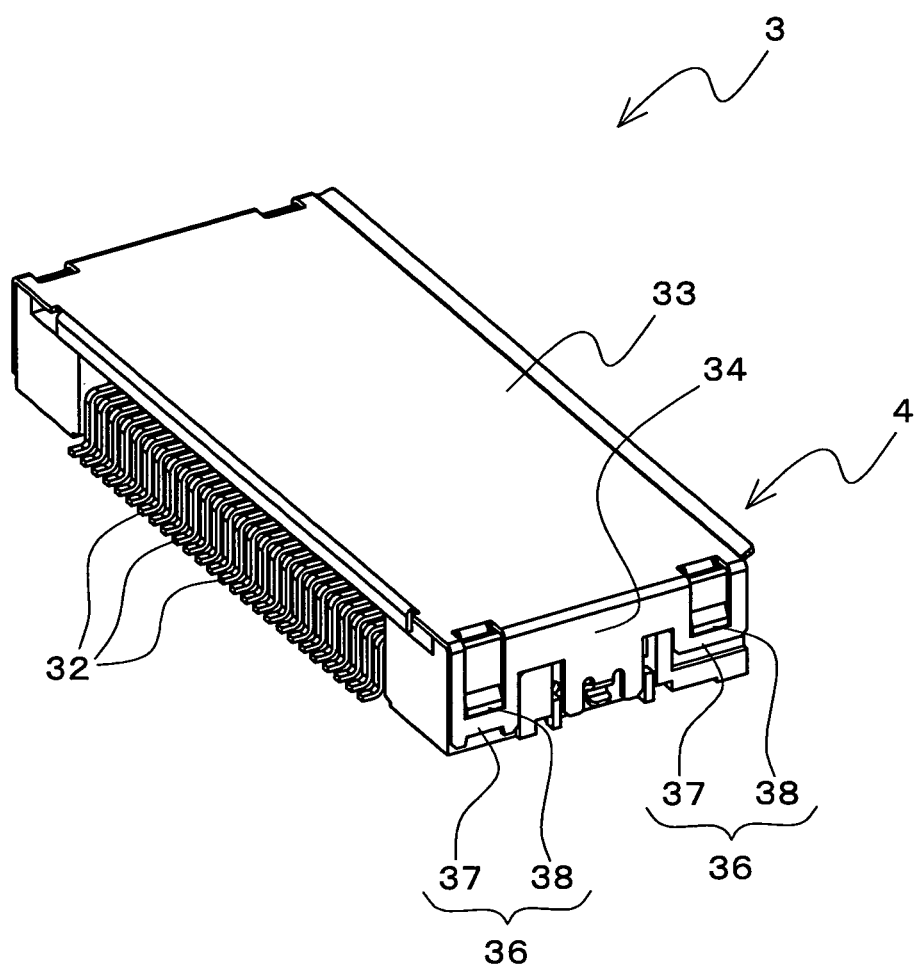
FIG. 12 is a perspective view showing a connector according to a second embodiment of the present invention.
Figure 13:
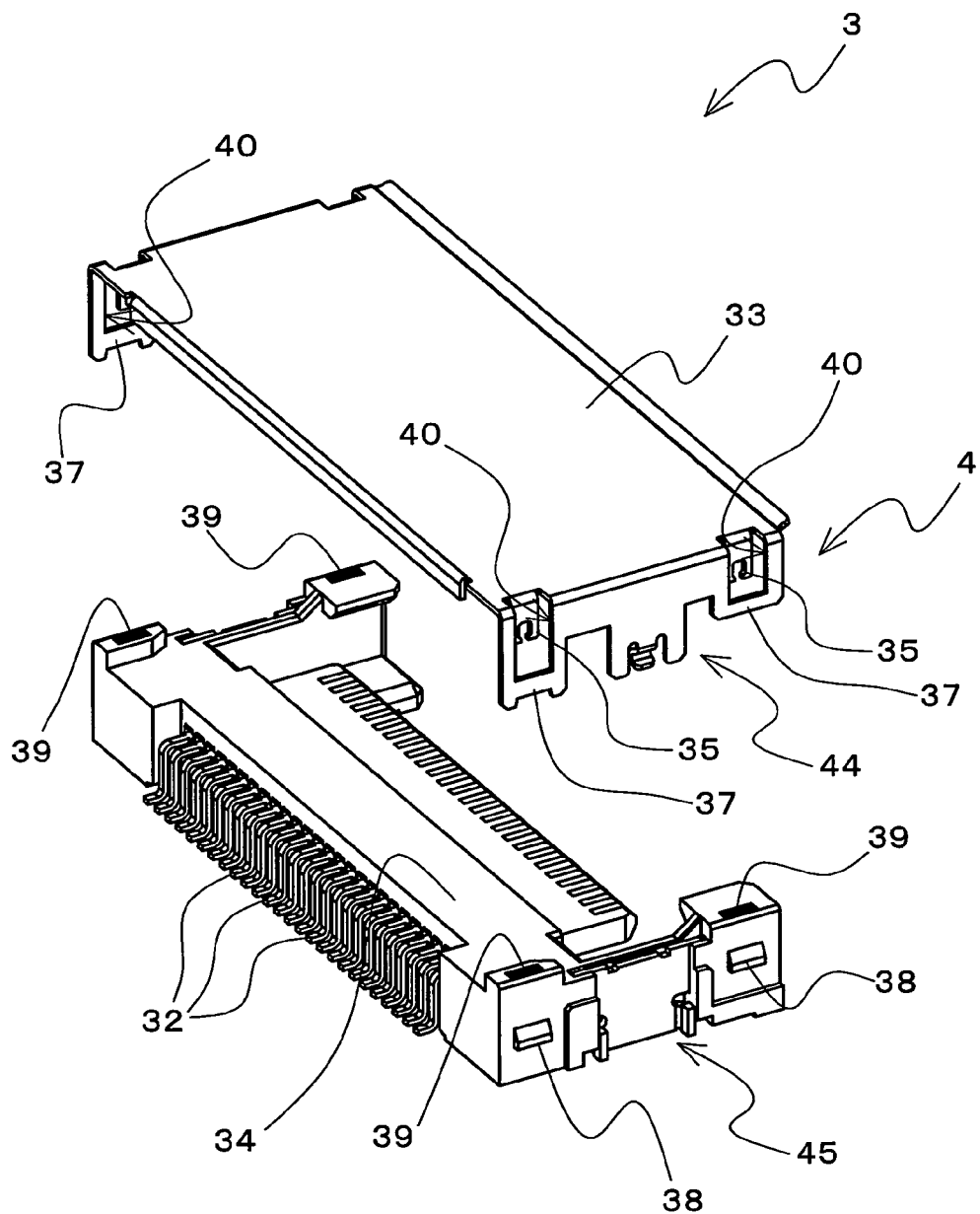
FIG. 13 is an exploded, perspective view of the connector shown in FIG. 12.

FIG. 12 is a perspective view showing a connector 3 according to a second embodiment of the present invention, and FIG. 13 is an exploded, perspective view of the connector 3. The connector 3 shown in FIGS. 12 and 13 is formed, for example, as a shield connector provided with an electromagnetic shielding shell to prevent the introduction of noise. Also, the connector 3 includes a component joining structure 4 according to the second embodiment of the present invention and a plurality of terminals 32, and is electrically connected to a mating connector component (not shown).

The component joining structure 4 shown in FIGS. 12 and 13 includes a metal cover 33, a body housing 34, ultrasonic welds 35 and locking mechanisms 36, and is configured as a structure in which the body housing 34 and the metal cover 33 are joined together. The body housing 34 is formed of a resin material, and constitutes a body component in this embodiment. The plurality of terminals 32 are held by the body housing 34 so that they are arranged in one direction in parallel orientation.

The metal cover 33 is formed of a metal material (e.g., a steel material), is provided in the form of a flat cover covering an inner portion of the body housing 34, and constitutes a cover component in this embodiment. The metal cover 33 is provided as an electromagnetic shielding shell member in the shield connector.

As shown in FIG. 13, the ultrasonic welds 35 are formed integrally with the metal cover 33, and formed protruding from the metal cover 33. The ultrasonic welds 35 are provided as elements that can join the metal cover 33 and the body housing 34 together by being fixed to the body housing 34 with ultrasonic welding. Also, the ultrasonic welds 35 are provided at positions corresponding to corner portions on both lateral sides of both ends of the metal cover 33 in the connector connection direction in which the connector 3 connects to a mating connector.

Figure 14:
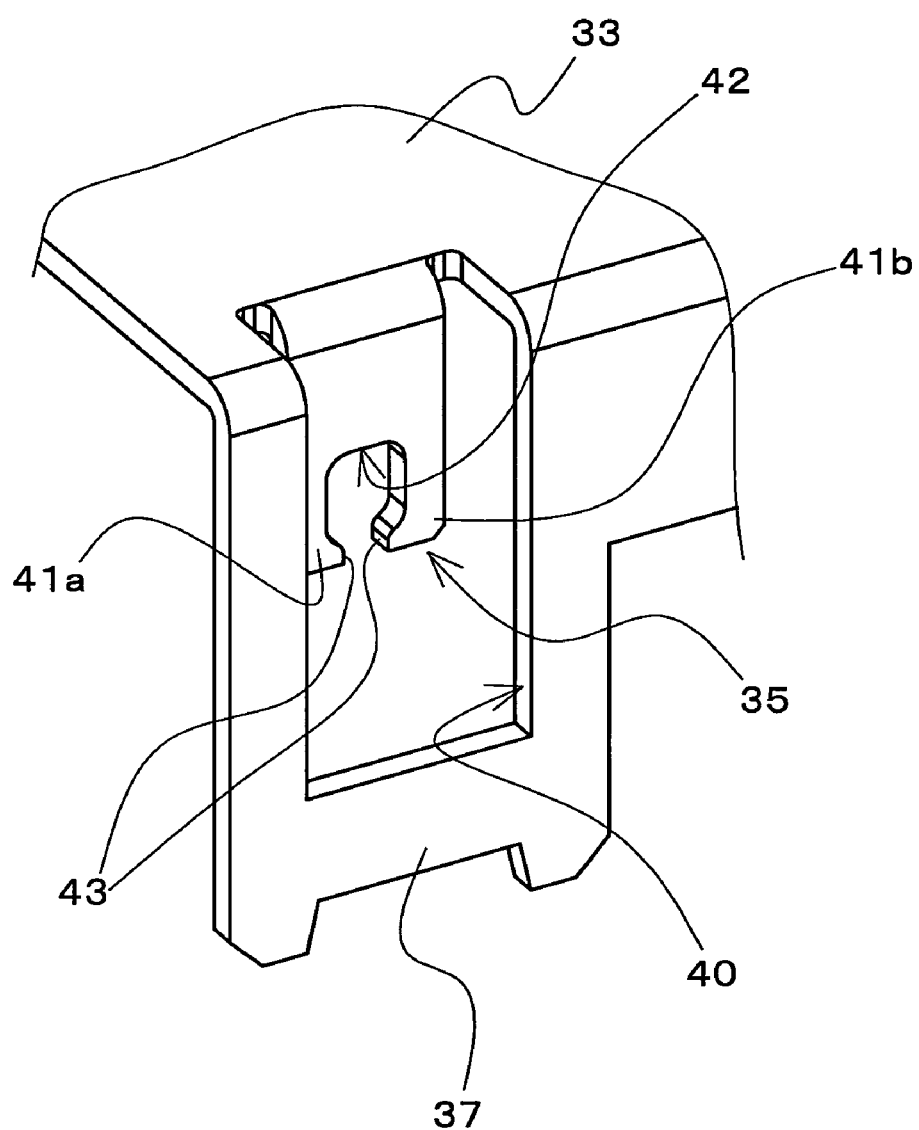
FIG. 14 is a perspective view showing, in enlargement, the vicinity of an ultrasonic weld in the connector shown in FIG. 13.

FIG. 14 is a perspective view showing, in enlargement, the vicinity of one ultrasonic weld 35. The ultrasonic welds 35 shown in FIGS. 13 and 14 are formed in the same manner as the corner ultrasonic welds 19 of the first embodiment. The ultrasonic welds 35 are provided bent at an edge portion of the metal cover 33, thereby protruding from the metal cover 33. Also, as is clearly shown in FIG. 14, the ultrasonic weld 35 is provided as a pair of projections (41a, 41b) protruding parallel to each other from the metal cover 33. The portion defined by the pair of projections (41a, 41b) and an edge portion of the metal cover 33 between the pair of projections (41a, 41b) is formed as an indentation 42 that is indented in a curved manner. At the tip ends of the pair of projections (41a, 41b) in the protruding direction, a tip portion 43 is formed where the interval between the projections is smaller in a direction perpendicular to the protruding direction.

The locking mechanisms 36 shown in FIGS. 12 and 13 include a first engaging portion 37 and a second engaging portion 38, and provided as mechanisms that can join the metal cover 33 and the body housing 34 together via the first and second engaging portions (37, 38) that engage with each other. The locking mechanisms 36 are provided at positions corresponding to corner portions on both lateral sides of both ends of the metal cover 33 and the body housing 34 in the connector connection direction.

The first engaging portions 37 shown in FIGS. 12 to 14 are formed integrally with the metal cover 33, and formed protruding from the metal cover 33. Also, the first engaging portions 37 are formed protruding parallel to the ultrasonic welds 35 from the metal cover 33. Further, the first engaging portions 37 are provided bent at an edge portion of the metal cover 33, thereby protruding from the metal cover 33.

Furthermore, the first engaging portion 37 and the ultrasonic weld 35 are disposed so that they are aligned in the inwardly facing direction in the metal cover 33, and the ultrasonic weld 35 is disposed on the inner side of the metal cover 33 relative to the first engaging portion 37. Additionally, the ultrasonic weld 35 is formed bent at an edge portion of the metal cover 33 on the inner side relative to the first engaging portion 37. Also, the first engaging portion 37 is provided as an annular portion protruding at an edge portion of the metal cover 33, and the inside of this annular portion is formed as an engaging hole 40 that engages with a second engaging portion 38. The ultrasonic weld 35 is disposed on the inner side of the metal cover 33 relative to the engaging hole 40, and is also disposed overlapping the engaging hole 40 in a direction perpendicular to the first engaging portion 37 (see FIGS. 13 and 14). It should be noted that this embodiment shows an example in which the first engaging portion 37 disposed at one end in the connector connection direction and the first engaging portion 37 disposed at the other end have different lengths.

The second engaging portions 38 shown in FIGS. 12 and 13 are formed integrally with the body housing 34. The second engaging portions 38 are configured to be engageable with the first engaging portions 37 at the engaging holes 40. Additionally, the second engaging portions 38 are each formed as a projection protruding outwardly of the body housing 34.

The following is a description of an operation of the component joining structure 4 when the connector 3 is assembled by joining the metal cover 33 and the housing 34 together. When the metal cover 33 and the body housing 34 are joined together, the first engaging portions 37 engage with the second engaging portions 38 at the same time as the ultrasonic welds 35 are ultrasonically welded to the body housing 34.

To assemble the connector 3, an operation of ultrasonically welding the ultrasonic welds 35 to the body housing 34 and an operation of engaging the first engaging portions 37 with the second engaging portions 38 are performed in a state in which the plurality of terminals 32 are held by the body housing 34. When the ultrasonic welding operation is performed, the ultrasonic welds 35 abut against recesses 39 that are recessed in the body housing 34, and the tip ends of the first engaging portions 37 are in a state abutted against the second engaging portions 38.

In the above-described state, ultrasonic vibrations are applied to the metal cover 33 by an ultrasonic vibration generator (not shown). Consequently, the resin material of a portion of the body housing 34 that abuts against the ultrasonic welds 35 is melted by the frictional heat generated by the energy of the ultrasonic vibrations. Then, the ultrasonic welds 35 are inserted to the inside of the body housing 34 while melting the resin material, and the application of ultrasonic vibrations is stopped when the ultrasonic welds 35 have been inserted to a predetermined insertion depth. Upon stopping the application of ultrasonic vibrations, the resin material that has been melted solidifies, so that the ultrasonic welds 35 are fixed to the body housing 34, thereby joining the metal cover 33 and the body housing 34 together. It should be noted that a slider 44 formed protruding from the metal cover 33 is held by a slider guiding portion 45 provided in the body housing 34 so that it slides in one direction, and thus, the direction in which the metal cover 33 moves to the body housing 34 in the ultrasonic welding operation is defined.

Further, in the above-described ultrasonic welding operation, the ultrasonic welds 35 are inserted to the inside of the body housing 34, and the first engaging portions 37 move in a parallel manner. Accordingly, the tip ends of the first engaging portions 37 that abut against the second engaging portions 38 are elastically deformed in such a manner that they are flexed outward. Then, when the tip ends of the first engaging portions 37 have further moved so as to climb over the second engaging portions 38, the first engaging portions 37 engage with the second engaging portions 38 at their engaging holes 40 (see FIG. 12). Consequently, the body housing 34 and the metal cover 33 are joined together via the engagement of the first engaging portions 37 with the second engaging portions 38.

As described above, in the ultrasonic welding, the first engaging portions 37 engage with the second engaging portions 38 at the same time as the ultrasonic welds 35 are ultrasonically welded to the body housing 34. Consequently, the metal cover 33 and the body housing 34 are joined together, thus completing assembly of the connector 3.

With the component joining structure 4 described above, the ultrasonic welds 35 that are formed protruding from the metal cover 33 are provided, and the locking mechanisms 36 including the first and second engaging portions (37, 38) that can engage with each other are provided in the metal cover 33 and the body housing 34. This makes it possible to join the metal cover 33 and the body housing 34 together, using a desired component joining structure, regardless of whichever of a joining system using the ultrasonic welding system and a joining system using the mechanical locking system is needed, as with the component joining structure 2 of the first embodiment. Furthermore, since the component joining structure 4 is provided with the ultrasonic welds 35 and the locking mechanisms 36, two types of joining systems can be realized using one type of component joining structure 4. Consequently, with the component joining structure 4, it is possible to decrease the number of components, and also reduce equipment costs and production control costs, as with the component joining structure 2 of the first embodiment.

Furthermore, with the component joining structure 4, as with the first embodiment, the two joining systems, namely the ultrasonic welding system and the mechanical locking system, can be used in combination in one component joining structure 4, thereby joining the metal cover 33 and the body housing 34 together. Consequently, it is possible to improve the joining strength between the metal cover 33 and the body housing 34. Further, in the component joining structure 4, the ultrasonic weld 35, which is similar to the corner ultrasonic weld 19 of the first embodiment, is provided, and the first engaging portion 37, which is similar to the first corner engaging portion 25a of the first embodiment, is provided. Accordingly, with the component joining structure 4, it is also possible to achieve the same functions and effects as the functions and effects that can be achieved by the corner ultrasonic weld 19 and the first corner engaging portion 25a of the first embodiment.

Furthermore, with the connector 3, it is possible to realize a connector that can achieve the same effects as the component joining structure 4. Thus, with this embodiment, it is possible to provide a connector 3 including a component joining structure 4 whereby it is possible to decrease the number of components, and also reduce equipment costs and production control costs.

Although embodiments of the present invention have been described thus far, all modifications, applications and equivalents thereof that fall within the claims, for which modifications and applications would become apparent by reading and understanding the present specification, are intended to be embraced therein. For example, the following modifications are possible.

(1) The above-described embodiments are described taking as an example a case where the present invention is applied to an IC card and a connector, but application of the present invention is not limited to such an example. That is, the present invention can be applied widely to component joining structures including a body component formed of a resin material and a cover component formed of a metal material, wherein the body component and the cover component are joined together. Furthermore, the present invention can also be applied widely to IC cards and connectors, without limitation to those illustrated in the embodiments of the present invention.

(2) The above-described embodiments are described taking as an example an IC card in which the second engaging portion is provided in another cover component, and a connector in which the second engaging portion is provided in the body component, but the present invention is not limited to such an example. That is, an IC card in which the second engaging portion is provided in the body component, and a connector in which the second engaging portion is provided in another component that is fixed to the body component may be embodied.

(3) The above-described embodiments are described taking as an example a case where the ultrasonic weld and the first engaging portion, which are disposed so that they are aligned in the inwardly facing direction in the cover component, are disposed at the corner portions of an IC card or a connector, but this need not be the case. That is, the ultrasonic weld and the first engaging portion, which are disposed so that they are aligned in the inwardly facing direction in the cover component, may be disposed at positions other than the corner portions. Furthermore, the embodiments are described taking as an example a case in which the ultrasonic weld is disposed on the inner side of the cover component relative to the first engaging portion, but this need not be the case; the first engaging portion may be disposed on the inner side of the cover component relative to the ultrasonic weld.

(4) The above-described embodiments are described taking as an example a case where the ultrasonic weld and the first engaging portion are provided bent at an edge portion of the cover component, thereby protruding from the cover component, but this need not be the case; the ultrasonic weld and the first engaging portion may be provided by a method other than bending.

(5) The above-described embodiments are described taking as an example a case where the ultrasonic weld is provided as a pair of projections that are formed so that the distance therebetween is smaller at their tip ends, and the first engaging portion is provided as an annular portion, but this need not be the case; the shape of the ultrasonic weld and the first engaging portion may be varied.

Figure 15:
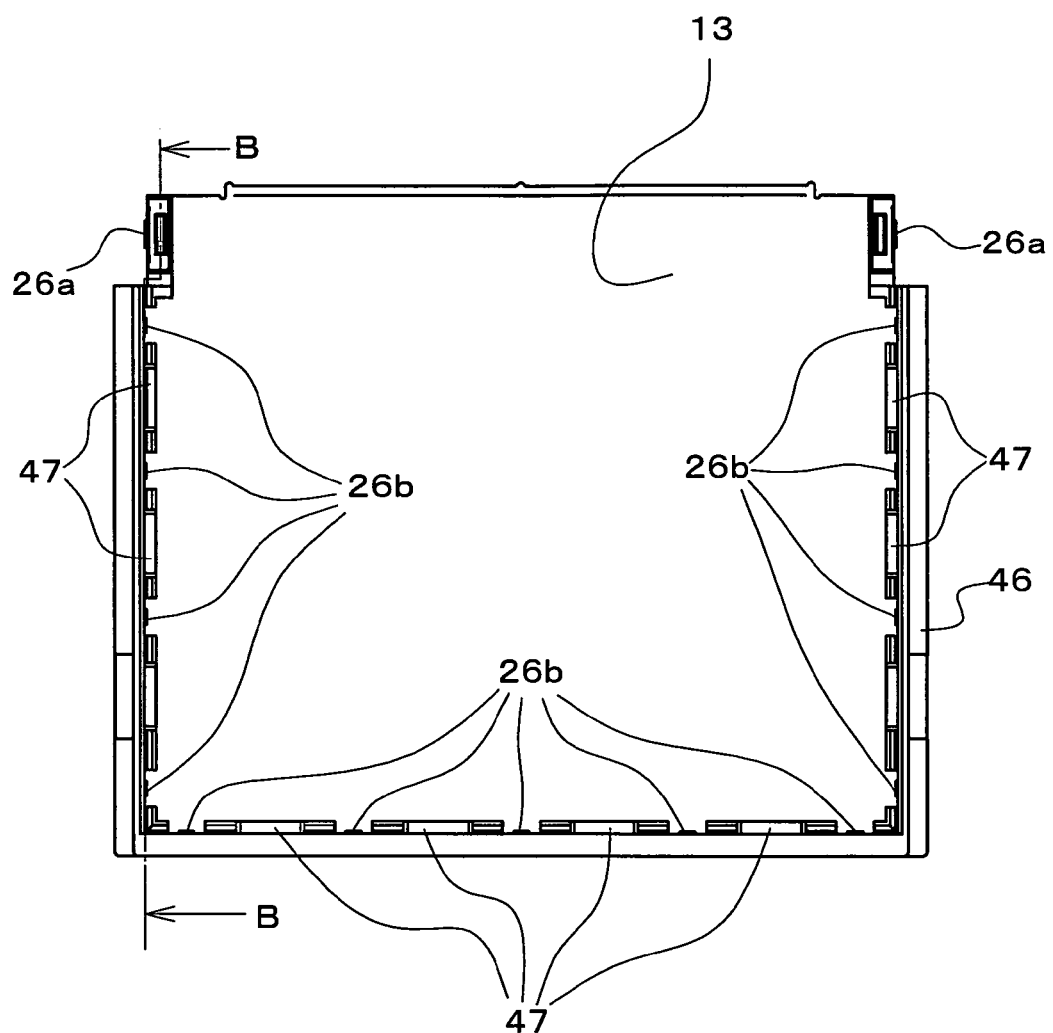
FIG. 15 is a diagram illustrating an IC card according to a modification.
Figure 16:
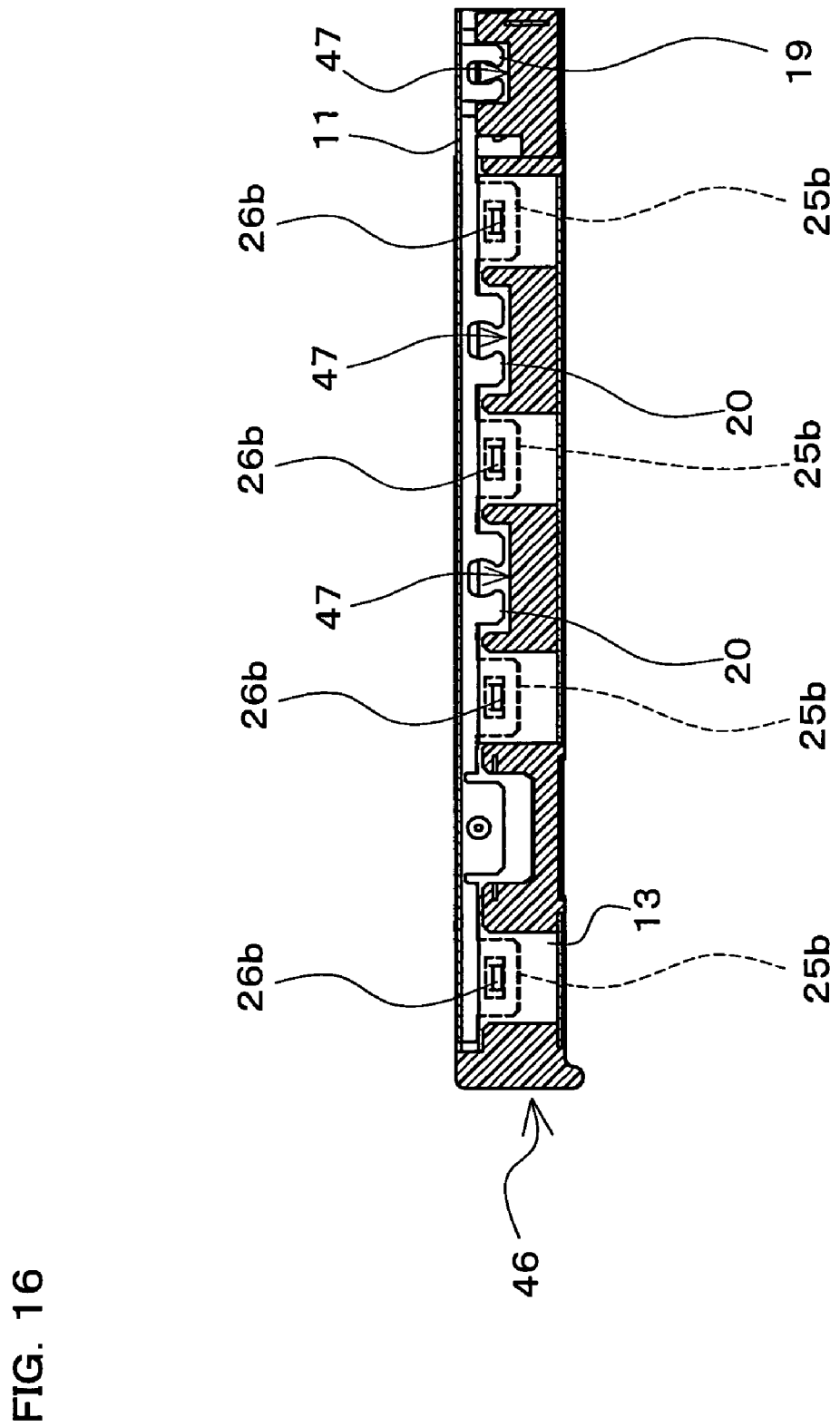
FIG. 16 is a diagram illustrating an IC card according to a modification.

(6) The above-described embodiments are described taking as an example component joining structures in which the ultrasonic weld that can join the cover component and the body component together is ultrasonically welded to the body component, but it is possible to join the cover component and the body component together with only the locking mechanism, without ultrasonically welding the ultrasonic weld to the body component. In this case, for example, a recess that is recessed in the form of a step so that it does not abut against the ultrasonic weld may be provided at a position corresponding to the ultrasonic weld in the body component. FIG. 15 is a diagram illustrating a modification in which step-like recesses are provided in a body frame (body component) of an IC card in order to prevent abutting against ultrasonic welds, and corresponds to FIG. 6. FIG. 16 is a diagram showing a cross section of the IC card of the modification taken along arrows B-B in FIG. 15, and corresponds to FIG. 11. It should be noted that in FIGS. 15 and 16, those elements configured in the same manner as in the above embodiments are denoted by identical reference numerals as in the above embodiments, and the description thereof has been omitted.

In the IC card shown in the modification in FIGS. 15 and 16, recesses 47 that are recessed in the form of steps so that they do not abut against the ultrasonic welds (19, 20) are provided at positions corresponding to the ultrasonic welds (19, 20) in a body frame (body component) 46 that is formed integrally with a second metal cover 13. By providing the recesses 47, even if the ultrasonic welds (19, 20) are formed in the first metal cover 11, it is possible to join the first metal cover 11 and the body frame 46 together with only the mechanical locking system using the locking mechanism without performing ultrasonic welding. Accordingly, when there is a need to join the first metal cover 11 and the body frame 46 together with only the mechanical locking system, this can be achieved without changing the shape of the first metal cover 11 at all. Furthermore, a mold used for molding the body frame 46 by injection molding can be easily provided by simply rearranging part of the components of the mold used for molding the body frame 12 of the above embodiments by injection molding. This will prevent an undesirable increase in the number of components, equipment costs, and production control costs.

(7) The above-described embodiments are described taking as an example component joining structures in which the first engaging portion and the second engaging portion engage in the locking mechanism that can join the cover component and the body component, but it is also possible to join the cover component and the body component together with only the ultrasonic weld without engaging the first engaging portion and the second engaging portion. In this case, for example, it is possible to adopt a configuration in which the position of one of the first engaging portion and the second engaging portion can be changed between an engaging position and a non-engaging position based on an operation.

The present invention can be widely applied as a component joining structure including a body component formed of a resin material, and a cover component formed of a metal material, wherein the body component and the cover component are joined together, and also as an IC card and a connector that include such a component joining structure.

What is claimed is:

1. A component joining structure comprising a body component formed of a resin material, and a cover component that is formed of a metal material and is provided in the shape of a cover covering at least part of the body component, the body component and the cover component being joined together, the structure further comprising:

at least one ultrasonic weld that is provided in the cover component, and is formed protruding from the cover component, and that can join the cover component and the body component together by being fixed to the body component with ultrasonic welding; and at least one locking mechanism that can join the cover component and the body component together via engaging portions that engage with each other, the ultrasonic weld is formed of a metal material and is formed integrally with the cover component which is formed of a metal material, the locking mechanism comprising:

at least one first engaging portion provided in the cover component; and at least one second engaging portion that is provided in the body component, or in another component fixed to the body component, and that can engage with the first engaging portion.

2. The component joining structure according to claim 1, wherein the first engaging portion is formed protruding from the cover component, and the ultrasonic weld and the first engaging portion are disposed so that they are aligned in the inwardly facing direction in the cover component.

3. The component joining structure according to claim 2, wherein the ultrasonic weld and the first engaging portion are provided bent at an edge portion of the cover component, thereby protruding from the cover component, and one of the ultrasonic weld and the first engaging portion is formed bent on the inner side relative to the other at an edge portion of the cover component.

4. The component joining structure according to claim 2, wherein the ultrasonic weld is disposed on the inner side of the cover component relative to the first engaging portion.

5. The component joining structure according to claim 4, wherein the first engaging portion is provided as an annular portion protruding at an edge portion of the cover component, and the inside of the annular portion is formed as an engaging hole that engages with the second engaging portion, and the ultrasonic weld is disposed on the inner side of the cover component relative to the engaging hole, and is disposed overlapping the engaging hole in a direction perpendicular to the first engaging portion.

6. The component joining structure according to claim 1, wherein a plurality of the ultrasonic welds and the first engaging portions are provided, and are alternately disposed aligned along an edge portion of the cover component.

7. The component joining structure according to claim 1, wherein the ultrasonic weld is provided as a pair of projections protruding parallel to each other from the cover component, and a portion where the interval between the pair of projections in a direction perpendicular to a protruding direction of the projections is smaller is formed at tip ends of the projections in the protruding direction.

8. The component joining structure according to claim 7, wherein a portion defined by the pair of projections and an edge portion of the cover component between the pair of projections is formed as an indentation that is indented in a curved manner.

9. The component joining structure according to claim 1, wherein the first engaging portion engages with the second engaging portion at the same time as the ultrasonic weld is ultrasonically welded to the body component.

10. The component joining structure according to claim 1, wherein the first engaging portion is formed protruding parallel to the ultrasonic weld from the cover component.

11. The component joining structure according to claim 1, wherein the other component is provided as another cover component that is formed of a metal material and separate from the cover component, and that is fixed to the body component, and the second engaging portion is provided in the other cover component.

12. An IC card comprising the component joining structure according to claim 1, and a substrate assembly that is held inside the component joining structure, and that comprises a substrate and a connector portion attached to the substrate, a connector-portion-penetrating ultrasonic weld that can penetrate through the connector portion to join the cover component and the body component together being provided as the ultrasonic weld, and a connector-portion-penetrating first engaging portion that can penetrate through the connector portion to engage with the second engaging portion being provided as the first engaging portion.

13. A connector comprising the component joining structure according to claim 1, and at least one terminal held by the body component, the connector being configured to be electrically connected to a mating connector component.

* * * * *